(12) United States Patent
Li et al.

(10) Patent No.: US 7,009,665 B2
(45) Date of Patent: *Mar. 7, 2006

(54) ELECTRO-OPTICAL GLAZING STRUCTURES HAVING SCATTERING AND TRANSPARENT MODES OF OPERATION AND METHODS AND APPARATUS FOR MAKING THE SAME

(76) Inventors: Le Li, 3491 Overlook Ave., Yorktown Heights, NY (US) 10598; Jian-Feng Li, 4820 Meredith Way, #305, Boulder, CO (US) 80303; Sadeg M. Faris, 24 Pocantico River Rd., Pleasantville, NY (US) 10570

( * ) Notice: Subject to any disclaimer, the term of this patent is extended or adjusted under 35 U.S.C. 154(b) by 0 days.

This patent is subject to a terminal disclaimer.

(21) Appl. No.: 10/746,248

(22) Filed: Dec. 24, 2003

(65) Prior Publication Data

US 2004/0160538 A1 Aug. 19, 2004

Related U.S. Application Data

(63) Continuation of application No. 09/544,522, filed on Apr. 6, 2000, now Pat. No. 6,671,008, which is a continuation-in-part of application No. 09/287,579, filed on Apr. 6, 1999, which is a continuation-in-part of application No. 09/032,302, filed on Feb. 27, 1998, now Pat. No. 6,559,903, which is a continuation-in-part of application No. 08/805,603, filed on Feb. 26, 1997, now Pat. No. 5,940,150, which is a continuation-in-part of application No. 08/739,467, filed on Oct. 29, 1996, now Pat. No. 6,034,753, which is a continuation-in-part of application No. 08/550,022, filed on Oct. 30, 1995, now Pat. No. 5,691,789.

(51) Int. Cl.
G02F 1/1333 (2006.01)
G02F 1/1335 (2006.01)

(52) U.S. Cl. .............................. 349/88; 349/92; 349/16
(58) Field of Classification Search .................. 349/16, 349/13, 92, 79, 88
See application file for complete search history.

(56) References Cited

U.S. PATENT DOCUMENTS

| 5,493,430 A | * | 2/1996 | Lu et al. ..................... 349/106 |
| 5,570,216 A | * | 10/1996 | Lu et al. ..................... 349/175 |
| 5,674,576 A | * | 10/1997 | Gotoh et al. ................. 428/1.2 |
| 5,691,795 A | * | 11/1997 | Doane et al. ................ 349/169 |
| 5,940,150 A | * | 8/1999 | Faris et al. .................... 349/16 |
| 6,049,366 A | * | 4/2000 | Hakemi et al. ............... 349/86 |
| 6,172,720 B1 | * | 1/2001 | Khan et al. ................... 349/35 |
| 6,671,008 B1 | * | 12/2003 | Li et al. ........................ 349/16 |
| 6,721,023 B1 | * | 4/2004 | Weiss et al. .................. 349/87 |

FOREIGN PATENT DOCUMENTS

JP 1-147424 * 6/1989
JP 04-125584 * 4/1992

* cited by examiner

*Primary Examiner*—Dung T. Nguyen
*Assistant Examiner*—Mike Qi

(57) ABSTRACT

Electro-optical glazing structures having total-scattering and total-transparent modes of operation which are electrically-switchable for use in dynamically controlling electromagnetic radiation flow in diverse applications.

6 Claims, 15 Drawing Sheets

"SCATTERING STATE"

"TRANSMISSION STATE"

LAMINATION METHOD

F I G. 11A
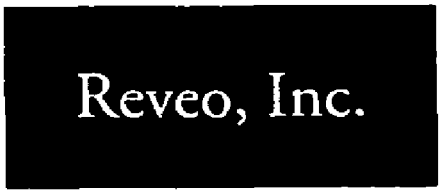
F I G. 11B
F I G. 11C
F I G. 11D
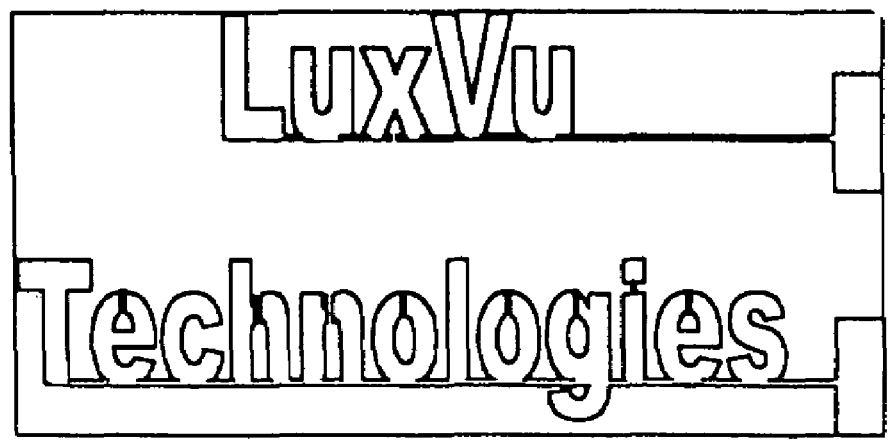
F I G. 12

| K₁ POSITION | K₂ POSITION | DISPLAY STATUS | NOTE |
|---|---|---|---|
| 0 | ANY, EXCEPT 1 | WHOLE PANE IS OPAQUE | |
| 2 | OPEN | TRANSPARENT PATTERN; OPAQUE BACKGROUND | |
| 3 | OPEN | OPAQUE PATTERN; TRANSPARENT BACKGROUND | |
| 2 OR 3 | 2 | WHOLE PANEL IS TRANSPARENT | THE PANEL MUST BE CURED UNDER THIS CONDITION |

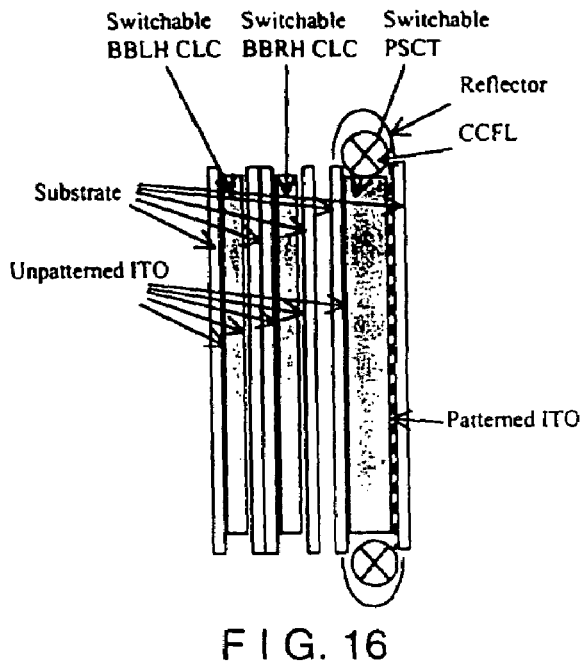

F I G. 16

| CCFL | BBLH CLC & BBRH CLC | PSCT | Display Status | Application |
|---|---|---|---|---|
| Off | Off | No signage | Whole panel is opaque or transparent | • Conventional switchable privacy glazing |
| Off | Off | With signage | Transparent pattern in opaque background, or vice versa | • Advertise and/or signage board for day-time application |
| Off | On | No signage | Whole panel is opaque or transparent | • Privacy glazing<br>• Darkness control |
| On | Off | No signage | Whole panel is opaque or transparent | • Conventional switchable privacy glazing with enhanced privacy protection<br>• Two-way surface light panel |
| On | Off | With signage | Transparent pattern in opaque background, or vice versa | • Advertise and/or signage board for night-time application |
| On | On | No signage | Whole panel is opaque or transparent | • Conventional switchable privacy glazing with an even more enhanced privacy protection<br>• One-way surface light source<br>• Could be a switchable mirror if PSCT is in the transparent state |
| On | On | With signage | Transparent pattern in opaque background, or vice versa | • Advertise and/or signage board for night-time application in an one-way lighting fashion. |

F I G. 17

ELECTRO-OPTICAL GLAZING STRUCTURES HAVING SCATTERING AND TRANSPARENT MODES OF OPERATION AND METHODS AND APPARATUS FOR MAKING THE SAME

RELATED CASES

The present application is a continuation of application Ser. No. 09/544,522, filed Apr. 6, 2000 now issued as U.S. Pat. No. 6,671,008, which is a Continuation-in-part of: copending application Ser. No. 09/287,579 entitled "Electro-Optical Glazing Structures Having Scattering and Transparent Modes of Operation and Methods and Apparatus for Making the Same" filed Apr. 6, 1999; which is a Continuation-in-part of application Ser. No. 09/032,302 entitled "Electro-Optical Glazing Structures Having Reflection and Transparent Modes of Operation" filed Feb. 27, 1998, now U.S. Pat. No. 6,559,903; which is a Continuation-in-part of application Ser. No. 08/805,603 entitled "Electro-Optical Glazing Structures Having Total-Scattering and Transparent Modes of Operation for Use in Dynamical Control of Electromagnetic Radiation" filed Feb. 26, 1997, now U.S. Pat. No. 5,940,150; application Ser. No. 08/739,467 entitled "Super Broadband Reflective Circularly Polarizing Material and Method of Fabricating and Using Same in Diverse Applications", by Sadeg M. Fans and Le Li filed Oct. 29, 1996, now U.S. Pat. No. 6,034,753; which is a Continuation-in-Part of application Ser. No. 08/550,022 entitled "Single Layer Reflective Super Broadband Circular Polarizer and Method of Fabrication Therefor" by Sadeg M. Fans and Le Li filed Oct. 30, 1995, now U.S. Pat. No. 5,691,789; copending application Ser. No. 08/787,282 entitled "Cholesteric Liquid Crystal Inks" by Sadeg M. Faris filed Jan. 24, 1997; which is a Continuation of application Ser. No. 08/265,949 entitled "Method and Apparatus for Producing Aligned Cholesteric Liquid Crystal Inks" filed Jun. 27, 1994, now U.S. Pat. No. 5,599,412; which is a Divisional of application Ser. No. 07/798,881 entitled "Cholesteric Liquid Crystal Inks" by Sadeg M. Fans filed Nov. 27, 1991, now U.S. Pat. No. 5,364,557; copending application Ser. No. 08/715,314 entitled "High-Brightness Color Liquid Crystal Display Panel Employing Systemic Light Recycling and Methods and Apparatus for Manufacturing the Same" by Sadeg Fans filed Sep. 16, 1996; and copending application Ser. No. 08/743,293 entitled "Liquid Crystal Film Structures with Phase-Retardation Surface Regions Formed Therein and Methods of Fabricating the Same" by Sadeg Faris filed Nov. 4, 1996; each said Application being commonly owned by Reveo, Inc, and incorporated herein by reference in its entirety.

BACKGROUND OF THE INVENTION

1. Field of Invention

The present invention relates generally to electro-optical structures having total-scattering and semi-transparent and totally-transparent modes of operation which are electrically-switchable for use in dynamically controlling electromagnetic radiation flow in diverse applications, such as electro-optical glazing structures, and also to improved methods and apparatus for producing such electro-optical structures in a large-scale and uniform manner, without defects or haze required applications such as switchable privacy window glazings.

2. Brief Description of the Prior Art

The use of windows in homes, commercial buildings, and automotive vehicles alike is very well known. The reasons for providing windows in such structures and systems are directly related to the functions they perform. For example, window structures provide for ventilation, lighting, a sense of spaciousness, as well as a way of making contact with the outdoors. Windows made of glazing (e.g. glass material) also permit selective transmission of electromagnetic radiation between the outdoors and the interior space of homes, commercial buildings, and automotive vehicles. While conventional forms of glazing serves many useful functions, such forms are not without problems.

An appreciation of the problems presented by the use of conventional glazing in windows, can be most easily attained by recognizing the nature and composition of electromagnetic radiation with which windows universally come in contact.

On a clear day at sea level, electromagnetic radiation is composed of 3% ultraviolet light (i.e. electromagnetic radiation in the UV band), 44% visible light (i.e. electromagnetic radiation in the visible band), and 53% infrared light (i.e. electromagnetic radiation in the IR band). In accordance with the laws of physics, 50% of all electromagnetic radiation produced is left hand circularly polarized (LHCP) while the other 50% thereof is right hand circularly polarized (RHCP). The total electromagnetic radiation striking a window surface is a combination of direct radiation from the Sun and diffuse radiation from the ambient environment. While electromagnetic radiation is broad-band in nature, it is the ultraviolet light component thereof which causes molecular decomposition in various types of plastic material and inorganic dyes, which results in color fading.

When electromagnetic radiation strikes a glass window, three different physical processes occur. Some of the radiant energy is transmitted through the glass; some of the radiant energy is reflected off the glass; and a small portion of the radiant energy is absorbed by the glass. The energy transmitted through the glass window is typically absorbed by furnishings or structures within the interior environment, and often becomes trapped therewithin causing an increase in interior temperature.

Depending on the season, electromagnetic radiation transmitted through glass windows can either mitigate or worsen the thermal loading imposed upon the heating and cooling systems associated with the glass windows. Consequently, during the hot weather season, it is highly desired to shield windows and sliding glass doors from electromagnetic radiation in order to lessen thermal loading, upon cooling systems. During cold weather season, it is highly desired to expose windows and sliding glass doors to electromagnetic radiation in order to lessen thermal loading on heating systems.

In short, it is highly desired to selectively control the transmission of electromagnetic radiation through window structures at different times of the day and year so that thermal loading upon the heating and cooling systems of residential, commercial and industrial building environments can be minimized. By minimizing such thermal loading, power can be used in an economical manner to control the internal temperature of residential, commercial and industrial building environments. Achievement of this goal would impact the natural environment in a positive manner, while improving the quality of life.

With such objectives in mind, great effort has been expended in recent times to improve the ways and means of selectively controlling the transmission of electromagnetic radiation through window structures.

One approach to electromagnetic radiation control involves using a window shade to reduce the transmission of electromagnetic radiation through windows. The most popular type of shade is the window blind. However, as window blind is mounted within the interior of the building transportation environment, electromagnetic radiation is allowed transmit through the window, raises the temperature within the internal environment, and thus increases thermal loading on cooling systems during the hot weather season. Also, the operation of window blinds requires mechanical or electromechanical controls which tend to be bulky and expensive to manufacture, install and maintain.

Another approach to electromagnetic radiation control involves the use of sun control films which are physically applied to the surface of glass windows in building and automotive vehicles alike. Presently a variety of different types of sun control film are marketed by various firms. Such electromagnetic control films can be categorized into one of the three basic categories, namely: high reflectivity film; heat saving or winter film; and fade protection film.

High reflectivity electromagnetic films are most effective at blocking summer heat. The higher the reflectivity of electromagnetic film, the more effective it will be at blocking electromagnetic radiation. Electromagnetic reflectivity film having a silver, mirror-like surface is more effective in blocking electromagnetic radiation than the colored, more transparent films. Electromagnetic reflectivity films can lower the U-value of glass by more than 10%. Notably, in climates having long heating seasons, the use of high reflectivity film prevents using the winter sun to warm the interior of buildings during the cold weather season, and thus lessen thermal loading on building heating systems.

Heat-saving or winter films are designed to reduce winter heat losses through glazing. These films can lower the U-value of glass windows by more than 20%.

Fade-protection films are designed to filter out ultraviolet rays. Ultraviolet rays cause about 60–65% of color fading in most home furnishing fabrics and automobile dash boards. While electromagnetic radiation control films of the types described above can be used to control heat and glare, eliminate sun damage, and to a lesser extent, reduce visibility into buildings during the daytime. The major disadvantages thereof are reduction in interior light, loss of visibility, and extra care required in cleaning. Moreover, prior art electromagnetic window films are incapable of changing from transmissive during winter months to reflective during summer months in order to effectively use electromagnetic radiation for dynamic temperature control of biological environments (e.g. human habitats, greenhouses and the like).

An alternative approach to electromagnetic radiation control involves using special glass panels having radiation transmission characteristics which effectively absorb (i.e. block) the infrared and ultra violet wavelengths, while transmitting the visible wavelengths thereby allowing window viewing and day light to enter the interior spaces of buildings using such window technology. While the light transmission characteristics of such glass provides a measure of electromagnetic radiation, control during cooling seasons, where outdoor temperatures tend to be above 72 degrees Fahrenheit, its IR absorption characteristics prevents, during heating season, IR wavelengths of sunlight to warm the interior spaces of building structures in which such glass panels are installed. Consequently, during heating seasons, such glass fails to lessen the thermal loading on the heating systems of such buildings, as would be desired in an effort to conserve energy and heating resources during the winter months.

In recent times, there has been great interest in using variable light transmission glass or glazing, referred to as "smart windows", to achieve electromagnetic radiation (i.e. energy) control in buildings and vehicles alike. The reason for using smart window structures, rather than conventional glass window panels, is quite clear. Smart window structures have light transmission characteristics that can be electrically controlled during the course of the day (or year) in order to meet lighting needs, minimize thermal load on heating and/or cooling systems, and provide privacy within the interior spaces of buildings and vehicles alike.

The use of chromogenic switchable glazing or smart windows for controlling the flow of light and heat into and out of a glazing according to occupant comfort, is discussed in great detail in the following papers: "Chromogenic Switchable Glazing: Towards the Development of the Smart Window" by Carl Lempert published in the June 1995 Proceedings of the Window Innovation Conference, Toronto, Canada; and "Optical Switching Technology for Glazings" by Carl Lempert published in Thin Solid Films, Volume 236, 1993, pages 6–13, both incorporated herein by reference.

In general, there are several different types chromogenic switchable glazing or smart windows, namely: non-electrically activated switchable glazings; and electrically-activated switchable glazings. The non-electrically activated types of chromogenic switchable glazing are based on: photochromics, thermochromics and thermotropics. The most common electrically-activated types of chromogenic switchable glazing are based on polymer dispersed liquid crystals (PDLC), dispersed particle systems (DPS), and electrochromics.

Prior art smart window structures based upon conventional twisted nematic (TN) or super twist nematic (STN) liquid crystal technology require the use of a pair of polarizers. This, however, results in high optical loss, as up to 60% of the incident light is absorbed by the polarizers, in the desired non-blocking mode of operation.

While a smart window structure based on polymer dispersed liquid crystal (PDLC) technology offers better performance than TN or STN based window structures, such smart window structures suffer from several significant shortcomings. Such electrochromic technologies are disclosed in greater detail in "Laminated electrochromic device for smart windows" by P. Schlotter, G. Baur, R. Schmidt, and U. Weinberg, P.351, Vol. 2255 (1994), and particle suspended technologies as disclosed in U.S. Pat. No. 4,663, 083, entitled "Electro-optical dipole suspension with reflective-absorptive-transmissive characteristics" issued to Alvin M. Marks.

For example, when a voltage is applied to the electrochromic, device in its "clear" state it darkens as ions (such as lithium ions) and associated electrons transfer from the counter electrode to the electrochromic electrode layer. The tinting continues until the electrochromic system reaches its most opaque state. Reversing the voltage polarity causes the ions and associated electrons to return to the counter electrode, and the device becomes more transparent. However, the electrochromic device suffers from slow response time and shorter life-time. In particle suspended technology, the micro-sized dipole metal flakes are suspended in a carrier. When no electric field is applied, the particles are more or less randomly oriented. Therefore, the light is mostly reflected and/or absorbed, resulting in a low transmittance. When an electric field is applied across the device thickness, all the particles are aligned in the field direction. The device shows an optically transparent state. However, this technology has a problem associated with the settling of the metal particles due to gravity.

Using liquid crystal to make electrically controllable light devices has the promise to overcome these problems. These devices introduce a polymer matrix in liquid crystal materials that can be switched from translucent to transparent state by applying an electric field.

One known method of creating a switchable electro-optical device, using stabilized liquid crystal structures is polymer dispersed liquid crystal (PDLC) as technology as disclosed in "Polymer-Dispersed Liquid Crystals: Boojums at Work", by J. William Doane, in MRS Bulletin/January, 1991. PDLC technology involves phase separation of nematic liquid crystal from a homogeneous liquid crystal mixture containing a suitable amount of polymer. The phase separation can be realized by polymerization of the polymer. The phase separated nematic liquid crystal forms micro-sized droplets dispersed in the polymer bed. All synthetic resins proposed before this invention are of the isotropic phase with an index $n_p$ matching the ordinary index $n_o$ of the nematic. In the off state, the liquid crystal molecules inside the droplets are randomly oriented. The mismatching of the refractive indices between the polymer bed and liquid crystal droplets causes the device to exhibit a translucent state, i.e., a light scattering state. When an electric field is applied, the liquid crystal orients in such a way that $n_o=n_p$, resulting in a transparent state. The main disadvantage of the PDLC technology is the inherent haze caused by the optical index mismatching, particularly at large viewing angles.

The second problem associated with prior art PDLC technology is its high cost of manufacture. Virocon/3M (U.S.A.), and Raychem/Taliq (U.S.A.) are commercial manufacturers of privacy window glazing based on PDLC technology. Due to the extremely high price of manufacture, such manufacturers are facing significant obstacles in expanding the PDLC privacy window market.

U.S. Pat. No. 5,691,795 entitled "Polymer Stabilized Liquid Crystal Light Modulation Device and Material" by J. William Doane et al, incorporated herein by reference, discloses another liquid crystal technology based on liquid crystal polymer stabilized cholesteric texture (PSCT), which can be used to create electro-optical structures, such as electro-optical glazing structures. In PSCT technology, a small amount of UV cross-linkable polymer in its liquid crystal phase is mixed with cholesteric liquid crystal (CLC) whose pitch is tuned to the infrared region. The mixture is then cured by exposure to UV light while a voltage is applied to align the liquid crystal as well as the polymer molecules in the direction across the device thickness. After curing and when no electric field is applied, the liquid crystal material, exists in a special cholesteric phase, i.e., a focal conic state. In this phase, the liquid crystal material exhibits a translucent state that is stabilized by the polymer network. When an electric field is applied, the CLC molecules are untwisted and aligned along the direction of the electric field, resulting in a transparent state. Since this technology requires much lower polymer concentration than that of PDLC technology and does not have liquid crystal droplets, it exhibits significantly lower haze, particularly when the refractive index of the polymer matches that of the cholesteric liquid crystal. However, this approach calls for polymerizable liquid crystalline material(s) to act as the polymer to stabilize the focal conic cholesteric phase.

Prior art PSCT technology has at least five significant problems which hitherto have neither been addressed or solved in a satisfactory manner.

First, PSCT technology imposes a high requirement on the selection of the polymer materials since liquid crystalline polymer that has a mesogenic group is needed as disclosed in U.S. Pat. No. 5,691,795, supra. Such a liquid crystal polymer material needs to be specially synthesized. Therefore, the cost of such a liquid crystalline polymer becomes extremely high, making the price of the PSCT device even higher than that of the PDLC.

Secondly, in typical PSCT systems, since monomers with mesogenic groups are used, the formation of the polymer network will partially alter the orientational order at each cross-linking site. Due to the presence of the mesogenic groups on the polymer network, the non-reactive liquid crystal molecules that are close to the network are now strongly anchored onto the network. To switch all liquid crystal molecules along the direction of the applied electric field, a strong field is needed. Such a field often brings about electric shorting problems. To avoid shorting, a switching electric field of modest strength is adopted by industry. However, the liquid crystal molecules close to the polymer, network will not respond to a modest switching field, resulting in strong haze, particularly at large oblique angles.

Thirdly, scaling-up the panel size of PSCT-based devices has been very difficult in practice. To make the device in large sizes, the same lamination technology adopted in making the PDLC can not be used because the glass substrates themselves are used to support the PSCT structure as the PSCT material is basically in a liquid-gel-like state.

Fourthly, making a large-size uniform PSCT device is difficult because this lamination method cannot be used. Rather, a filling method is called for. However, when filling liquid crystal into a large size panel, the flow streaks of the liquid crystal and polymer mixture induce readily noticeable marks. Therefore, the resulting PSCT device appears very non-uniform.

Finally, the cost of glass substrates with conductive Tin Oxide layer coatings is very expensive when using PSCT-based technology. Also, the cost of plastic substrates with conductive Tin Oxide layer coatings is very expensive when using PDLC technology. Such factors contribute to the high price of electro-optical devices based on PDLC and PSCT technologies.

Accordingly, there is a great need in the art to improved means and ways of manufacturing large-size liquid crystal based electro-optical glazing structures at lower costs than that afforded by prior art manufacturing systems and methodologies.

Thus it is clear that there is a great need in the art for an improved form of variable light transmission glazing structures and methods and apparatus for making the same in a way which avoids the shortcomings and drawbacks of prior art technologies.

OBJECTS AND SUMMARY OF THE PRESENT INVENTION

Accordingly, a primary object of the present invention is to provide an electro-optical glazing structure which avoids the shortcomings and drawbacks of prior art technologies.

Another object of the present invention is to provide an electro-optical glazing structure which has total-scattering and total-transmission modes of operation for improved control over the flow of electromagnetic radiation within the solar region of the electromagnetic spectrum (i.e. Solar Spectrum).

A further object of the present invention is to provide such an electro-optical glazing structure, in which the modes of operation can be electrically-activated or switched, while avoiding the use of energy absorbing mechanisms.

A further object of the present invention is to provide such an electro-optical glazing structure having a broad band of operation, including the near-IR, visible and near-UV portions of the electromagnetic spectrum.

Another object of the present invention is to provide an actively-controlled window or viewing panel constructed from the electro-optical glazing structure of the present invention, wherein the transmission of electromagnetic radiation over the near-UV and near-IR regions of the electromagnetic spectrum can be totally scattered, rather than absorbed, reducing the temperature cycle range which the window structure is required to undergo.

Another object of the present invention is to provide a large-size actively-controlled window or viewing panel employing an electro-optical glazing structure fabricated from a polymer stabilized cholesteric texture (PSCT) that uses low cost liquid crystal materials.

Another object of the present invention is to provide a large-size low-cost electro-optical glazing structure having uniform optical characteristics and is constructed using low-cost PSCT polymer materials.

Another object of the present invention is to provide a PSCT-based electro-optical glazing structure that uses a polymer which does not have the liquid crystalline phase (i.e. the polymer does not have the mesogenic group) as required by prior art liquid crystal compounds.

Another object of the present invention is to provide a PSCT-based electro-optical glazing structure that uses dichroic dyes in a low cost PSCT material.

Another object of the present invention is to provide a large-size PSCT-based electro-optical glazing structure that can be switched using relatively lower voltages than that required by prior art devices.

Another object of the present invention is to provide a PSCT-based electro-optical glazing structure that has improved mechanical strength.

Another object of the present invention is to provide a PSCT-based electro-optical glazing structure that uses low cost glass substrates.

Another object of the present invention is to provide a PSCT-based electro-optical glazing structure that uses low cost glass substrates with insulating layers.

Another object of the present invention is to provide a PSCT-based electro-optical glazing structure made using a special additive which eliminates liquid crystal flow streaks.

Another object of the present invention is to provide a PSCT-based electro-optical glazing structure which is made using a low cost conductive, layer as electrode surfaces on the glass substrates thereof.

Another object of the present, invention is to provide an improved method of fabricating a PSCT-based electro-optical glazing structure manufacture process in a way which enables the manufacture of low-cost PSCT-based devices having surface areas greater than 2 meters.times.3 meters.

Another object of the present invention is to provide an improved system and method; for making low-cost PSCT-based electro-optical glazing structures which are haze-free, defect-free, and have uniform optical characteristics over the surface area of the device.

Another object of the present invention is to provide an improved system and method for making low-cost PSCT-based electro-optical glazing structures using inexpensive liquid crystal material which does not have the liquid crystalline phase (i.e. the polymer does not contain the mesogenic group) as required by prior art liquid crystal compounds.

Another object of the present invention is to provide an improved system and method for making low-cost PSCT-based electro-optical glazing structures which utilizes float-glass fabrication techniques.

Another object of the present invention is to provide an improved system and method for making low-cost PSCT-based electro-optical glazing structures which involves the addition of a surfactant in order to achieve uniform optical properties across the entire surface of the electro-optical glazing structure.

Another object of the present invention is to provide an improved system and method for making low-cost PSCT-based electro-optical glazing structures which utilizes low-cost plastic substrate panels.

Another object of the present invention is to provide an electro-optical electrically-switchable edge-lit lighting panel capable of visually producing a signage work (i.e. graphical image) for projecting either commercial or personal expressions under electronic control.

Another object of the present invention is to provide an edge-lit electro-optical signage system, in which PSCT material is contained between a pair of optically-clear substrate panels having electrically-conductive layers that are geometrically patterned in accordance with the signage work (i.e. graphical image) to be visually expressed.

Another object of the present invention is to provide such an edge-lit electro-optical signage system, that is capable of serving at least three functions, namely: (1) as an electrically-switchable privacy window structure having greatly enhanced privacy protection; (2) as an electrically-switchable lighting panel for illumination; and (3) as an electro-optical signage board for visually displaying signage works (i.e. graphical images) in both day time and night viewing environments.

Another object of the present invention is to provide such an edge-lit electro-optical lighting panel having a diverse set of electrically-switchable display states for use in various applications including, for example: conventional switchable privacy glazings; advertising and/or signage boards for day-time applications; privacy glazings and darkness control applications; conventional switchable privacy glazing applications with enhanced privacy-protection; two-way surface lighting panel applications; advertising and/or signage boards for night-time applications; one-way surface light source applications; switchable mirror applications; and advertising and/or signage boards for night-time applications in a one-way lighting fashion.

Another object of the present invention is to provide an intelligent window system for installation within a house or office building, or aboard a transportation vehicle such as an airplane or automobile, wherein the electro-optical glazing structure of the present invention is supported within a prefabricated window frame, within which are mounted: a electromagnetic-sensor for sensing electromagnetic conditions in the outside environment; a battery supply for providing electrical power; a electromagnetic-powered battery recharger for recharging the battery; electrical circuitry for producing glazing control voltages for driving the electrically-active elements of the electro-optical glazing supported within the window frame; and a micro-computer chip for controlling the operation of the battery recharger and electrical circuitry and the production of glazing control voltages as required by a radiation flow control program stored within the programmed microcontroller.

A further object of the present invention is to provide such an electro-optical window structure which is designed for integration within the heating/cooling system of a house, office building, factory or vehicle in order to control the flow of broad-band electromagnetic radiation through the electro-optical window structure, while minimizing thermal loading upon the heating/cooling system thereof.

Another object of the present invention is to provide a thermal/viewing shield or panel made from electro-optical glazing structure of the present invention.

Another object of the present invention is to provide an intelligent pair of sunglasses, in which each optical element is realized using an electro-optical glazing structure of the present invention, fashioned to the dimensions of a sunglass frame.

Another object of the present invention is to provide an intelligent pair of shutter glasses, in which each optical element is realized using an electro-optical glazing structure of the present invention, fashioned to the dimensions of a shutter glass frame.

Another object of the present invention is to provide an intelligent windshield or viewing, screen, which is realized from an electro-optical glazing structure of the present invention.

These and other objects: of the present invention will become apparent hereinafter and in the claims to Invention.

BRIEF DESCRIPTION OF THE DRAWINGS

For a more complete understanding of the Object of the Present Invention, the following Detailed Description of the Illustrative Embodiments of the Present Invention should be read in conjunction with the accompanying Drawings, wherein:

FIGS. 11A through 11D schematically illustrate the four principal states over of operation of the PSCT-based signage panel shown in FIG. 10;

FIG. 12 is a schematic representation of the photo mask that can be used to geometrically pattern the electrically-conductive optically-clear layers employed in the PSCT-based signage panel of FIG. 10;

FIG. 16 is cross-sectional schematic diagram of an another embodiment of an edge-lit electro-optical PSCT-based signage system of the present invention, in which the PSCT-based glazing panel of FIG. 10 functions as a subcomponent so as to provide a system having an increased number of states of operation with the provision of enhanced functionality; and FIG. 17 is a table listing the various states of operation of the PSCT-based signage panel shown in FIG. 16, and the states of operation of its subcomponents ii (e.g. CCFL, electrically-switchable BBLH CLC panel, electrically-switchable BBRH CLC panel, and electrically-switchable PSCT panel), which when configured together, produce the numerous states of physical operation of the composite signage panel.

DETAILED DESCRIPTION OF THE ILLUSTRATIVE EMBODIMENTS OF THE PRESENT INVENTION

Figure 1A:
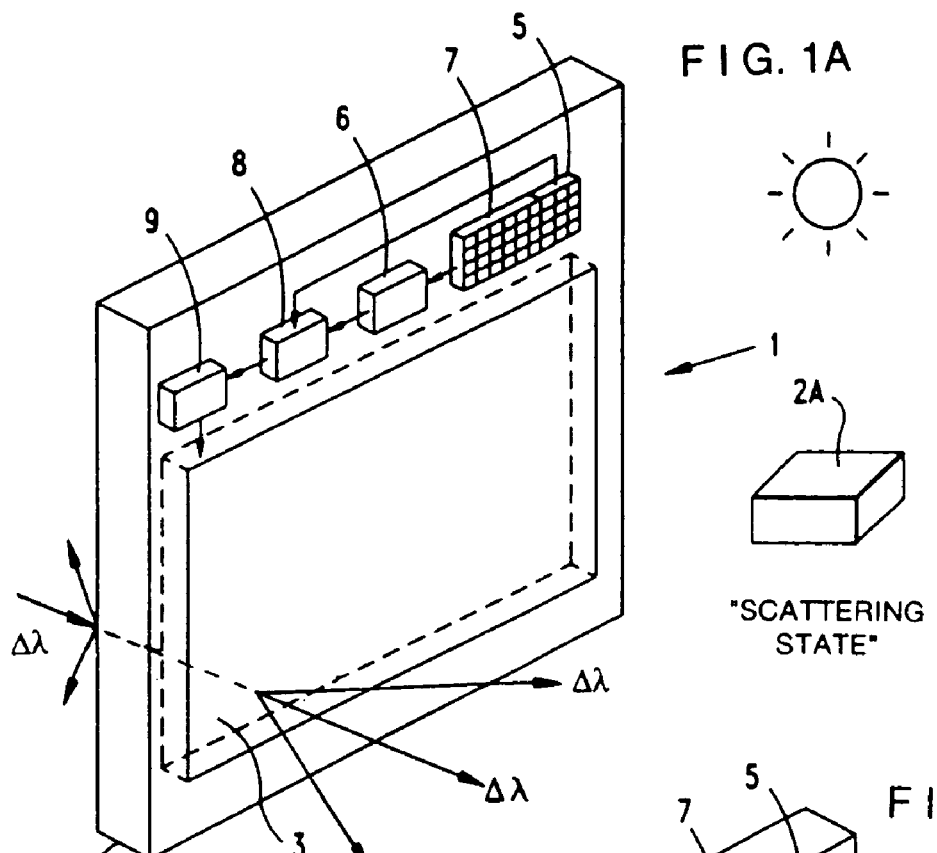
FIG. 1A is a perspective view of a generalized embodiment of the intelligent electro-optical window system of the present invention, wherein the electro-optical glazing structure thereof is electrically, switched under microcomputer-control to its totally-scattering state of operation upon detecting a first set of preprogrammed electromagnetic conditions, whereby broad-band electromagnetic radiation (e.g. associated with interior scenery or objects) is completely scattered as the electromagnetic radiation propagates through the electro-optical glazing structure thereof.

Referring now to the accompanying Drawings, illustrative embodiments of the intelligent electro-optical window of the present invention will be described in great detail. In each of the figures, like structures and elements shall be indicated by like reference numerals.

Figure 1B:
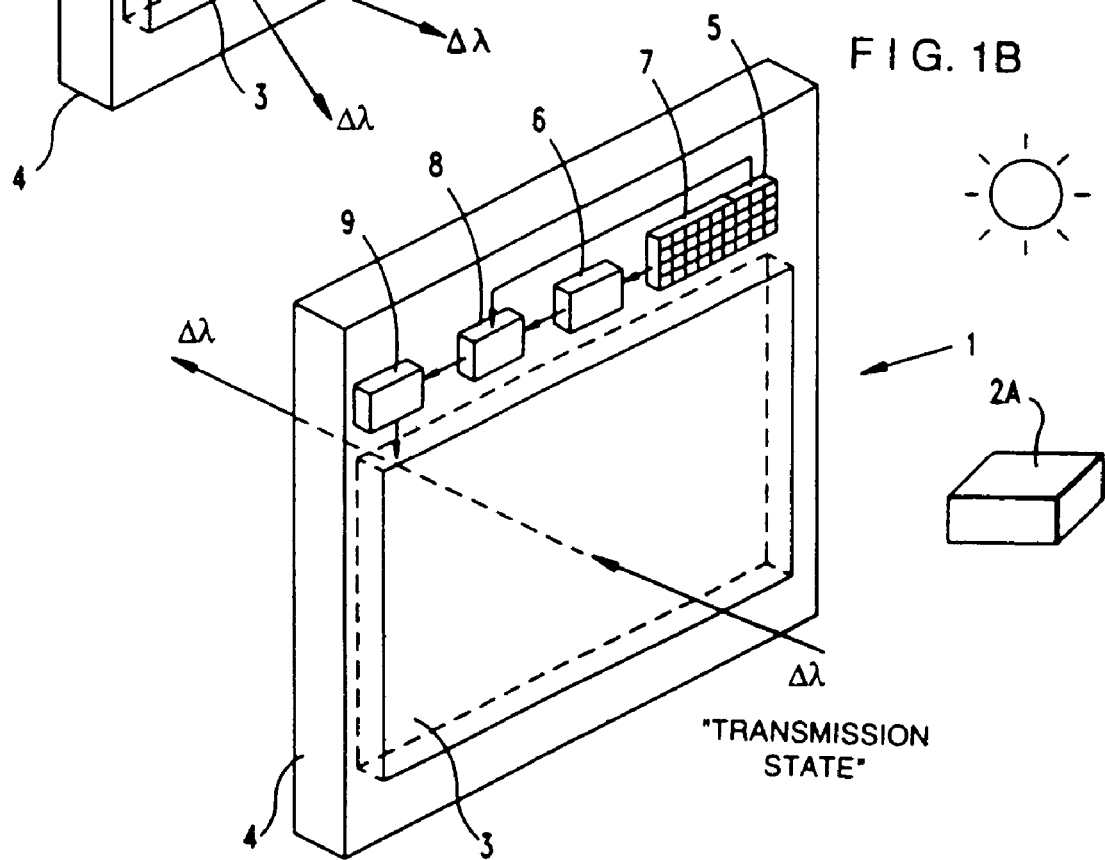
FIG. 1B is a perspective view of the generalized embodiment of the intelligent electro-optical window system shown in FIG. 1A, wherein the electro-optical glazing, structure thereof is electrically switched under microcomputer-control to its transmission state of operation upon detecting a second set of preprogrammed electromagnetic conditions, where broad-band electromagnetic radiation is transmitted through the electro-optical glazing structure thereof.

In FIGS. 1A and 1B, a generalized embodiment of the intelligent electro-optical glazing structure (i.e. window structure) of the present invention is shown installed within an environment (e.g. building or vehicle) having an interior space or volume adjacent the window structure. Typically, the interior space or volume functions as a form of human habitat, although there may be applications in which this is not the case. Preferably, the intelligent electro-optical window structure 1 cooperates with the heating/cooling system 2A of a house, office building, factory or vehicle. In such preferred applications, the function of the electro-optical window structure will be to selectively control the flow of electromagnetic radiation through its electro-optical glazing structure and into the interior space, in order to minimize or reduce thermal loading upon the heating/cooling system of the environment.

As shown in FIGS. 1A and 1B, the electro-optical glazing structure 1 comprises an electro-optical glazing panel 3 securely supported within a prefabricated window frame 4 which can be realized using virtually any suitable material such as, for example, plastic, metal, rubber, wood or composite material. Within the window frame, a number of system subcomponents are securely mounted, namely: a electromagnetic-radiation sensor 5 for sensing electromagnetic conditions in the outside environment; a rechargeable-type battery 6 for producing electrical power within the window frame; an electromagnetic-powered battery recharger 7 for recharging the rechargeable battery 6; a micro-controller (e.g. RISC-type micro-computer chip with onboard ROM, EPROM and RAM) 8 for controlling the battery recharger and glazing control signals as required by a radiation flow control program stored within the micro-computer chip; and electrical circuitry 9, response to glazing control signals, for producing control voltages that are applied to the electrically-active elements of the electro-optical glazing structure 3 to electrically switch the same from one optical state to another optical state under microcontroller control.

As shown in FIG. 1A, when a first set of preprogrammed electromagnetic conditions (e.g. a first prespecified band of electromagnetic radiation having power above a first prespecified power threshold) is detected by the electromagnetic-radiation sensor, the electro-optical glazing structure 3 is electrically switched to its totally-scattering state of operation under the control of preprogrammed microcontroller 8. In this totally-scattering state of operation, visible and electromagnetic radiation is completely scattered off the glazing structure over abroad band of spectral wavelengths (e.g. from the near IR band, over the optical band, to the far UV band), with about 75% of the incident light being forward scattered and about 25% thereof being back-scattered. In this state of operation, the phase distribution of the wavefront of incident light is sufficiently distorted so as to render the electro-optical glazing structure highly-translucent, but incapable of projecting images therethrough without severe distortion, as would be desired in privacy applications.

As shown in FIG. 1B, when a second set of preprogrammed electromagnetic conditions (e.g. a second prespecified band of electromagnetic radiation having power above a second prespecified power threshold) is detected by electromagnetic-radiation sensor, the electro-optical glazing structure 3 is electrically switched to its transmission state of operation under the control of preprogrammed microcontroller 8. In this transmission state, visible and electromagnetic radiation is transmitted through the electro-optical glazing structure over a broad band of spectral wavelengths (e.g. from the near-IR band, over the optical band, to the far-UV band).

While only two particular scattering/transmission states are illustrated in the above generalized embodiment, it is understood that virtually any set of intermediate scattering/transmission characteristics can be realized by the window structure of the present invention, to provide a "grey-scale" lighting control as required by the particular application at hand. In each such embodiment of the present invention, a particular set of conditions can be predefined to trigger a change in the optical state of the electro-optical glazing structure of the present invention. Then microcontroller is programmed to switch the optical state of the glazing structure upon detecting the corresponding condition. In alternative embodiments, the environmental condition or conditions which cause a switching operation, need not be related to electromagnetic radiation, but may be related to moisture, barometric pressure, temperature, or any other parameter prespecified within the programmed microcontroller 8.

While in theory there exists an infinite number of embodiments of the electro-optical glazing structure of the present invention, one illustrative embodiment of the electro-optical glazing structure will be described in detail below in order to illustrate the inventive features thereof. Various formulations are provided for making the electro-optical glazing structure of the present invention.

By virtue of such ultra broad-band operating characteristics of the electro-optical glazing material hereof, and the novel panel configurations disclosed herein, it is now possible to provide a level of electromagnetic radiation control hitherto unattainable by prior art smart window systems and methodologies.

The Electro-Optical Glazing Structure of the Present Invention

Figure 2:
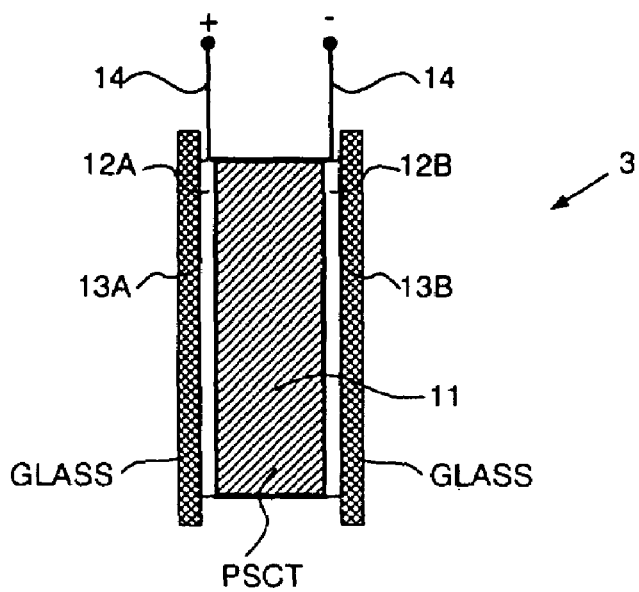
FIG. 2 is a cross-sectional view of an illustrative embodiment of the electro-optical glazing structure of the present invention, showing a PSCT liquid crystal material interposed between a pair of optically-transparent electrically-conductive film layers (e.g. Tin Oxide or optically-transparent photoconductive polymer) supported upon a pair of spaced-part glass substrate panels, the perimeter edges of which are sealed in a conventional manner, and across which a control voltage is applied.
Figure 3A:
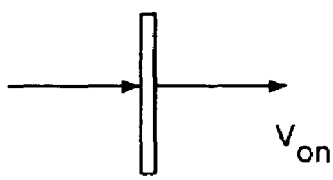
FIG. 3A shows the electro-optical light scattering structure of FIG. 2 operated in its transmission mode, wherein an external voltage is applied across the optically-transparent, electrically-conductive (e.g. Tin Oxide) surfaces (i.e. $V=V_{on}$)
Figure 3D:
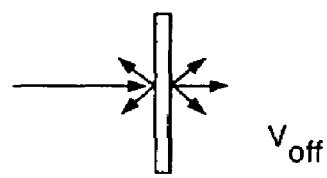
FIG. 3D shows the electro-optical light scattering structure of FIG. 2 operated in its light scattering mode, wherein no external voltage V is applied across the optically-transparent, electrically-conductive (e.g. Tin Oxide) surfaces (i.e. $V=V_{off}$)
Figure 3B:
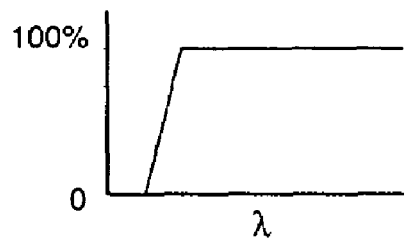
FIGS. 3B and 3C show transmission and scattering characteristics for the mode of operation indicated in FIG. 3A.
Figure 3E:
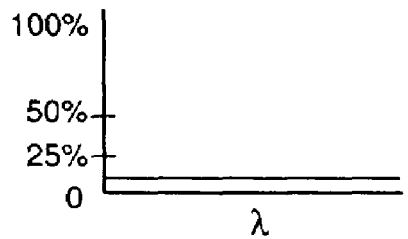
FIGS. 3E and 3F show transmission and scattering characteristics for the mode of operation indicated in FIG. 3D.
Figure 3C:
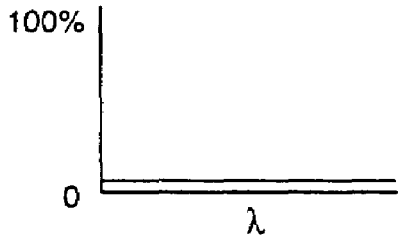
Figure 3F:
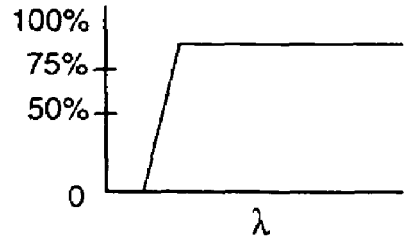

Referring to FIGS. 2 through 3F, the illustrative embodiment of the electro-optical glazing structure of the present invention will be described in great detail.

As shown in FIG. 2, the electro-optical glazing structure of the illustrative embodiment 3 comprises: a PSCT liquid crystal material 11 interposed between a pair of optically-transparent electrically-conductive film layers 12A and 12B (e.g. Tin Oxide or other optically-transparent photoconductive polymer or like film coating) supported upon a pair of spaced-part glass substrate panels 13A and 13B, respectively, the perimeter edges of which are sealed in a conventional manner, and across which a control voltage 14 is applied under the control of microcontroller 8. Preferably, the sealed electro-optical glazing structure depicted in FIG. 2 is mounted within a frame structure, as described in connection with the generalized embodiment shown in FIGS. 1A and 1B, and incorporates all of the power generation, electromagnetic radiation detection and micro-control mechanisms thereof.

In FIG. 3A, the electro-optical light scattering, structure of FIG. 2 is shown operated in its transmission mode or state, wherein an external voltage (e.g. 110 Volts at 50 HZ) is applied across surfaces 12A and 12B (i.e. $V=V_{on}$). In FIGS. 3B and 3C, transmission and scattering characteristics for this mode of operation are shown, respectively. In FIG. 3D, the electro-optical light scattering structure of FIG. 2 is shown operated in its light scattering mode or state, wherein no external voltage V is applied across surfaces 12A and 12B (i.e. $V=V_{off}$). In FIGS. 3E and 3F, transmission and scattering characteristics for this mode of operation are shown, respectively. As light is transmitted when an external voltage is applied, and scatters when no voltage is applied, this structure is said to operate in the "normal mode".

Figure 4:
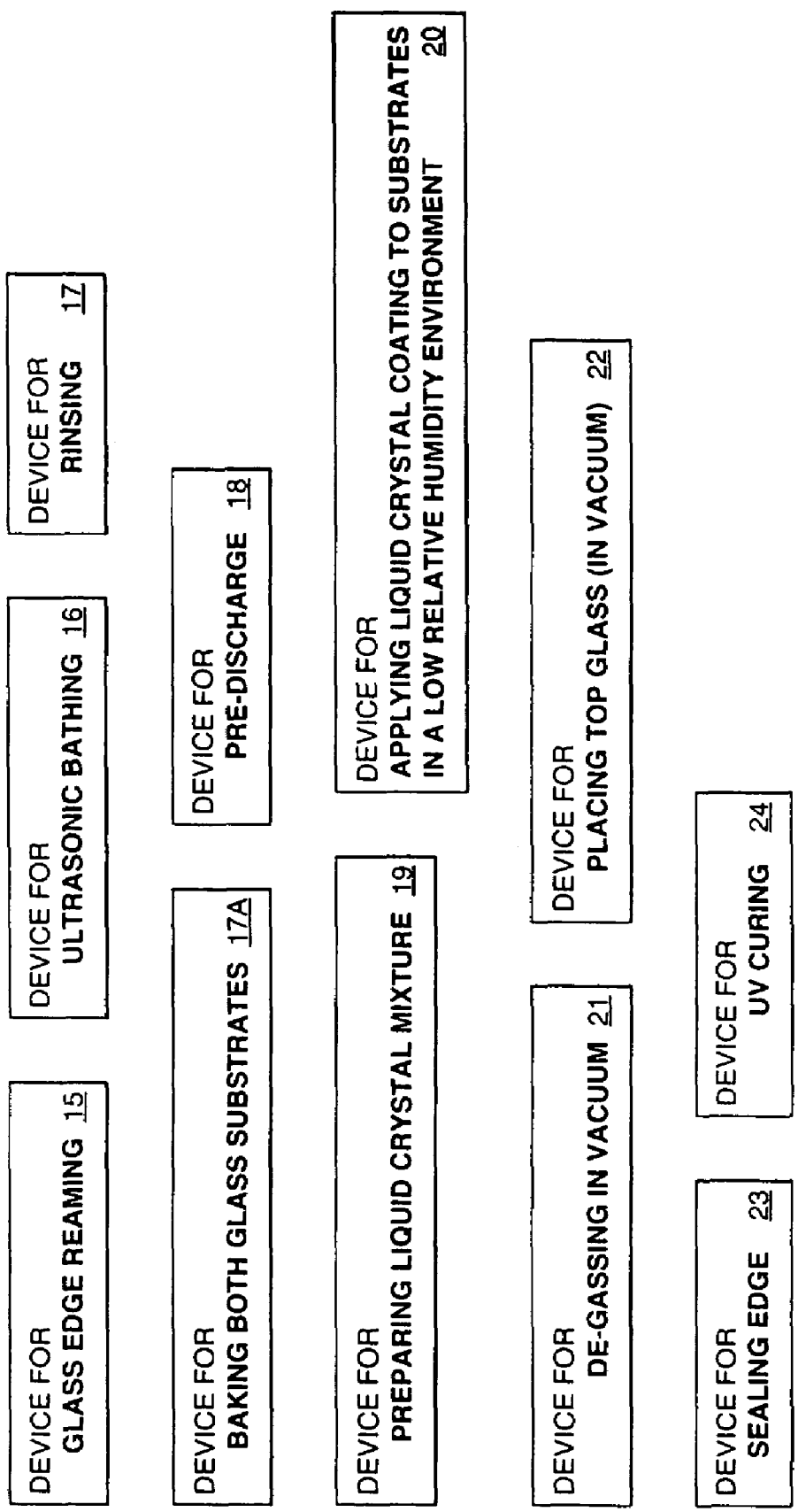
FIG. 4 is a schematic diagram illustrating the major subsystems and subcomponents associated with the system for manufacturing electro-optical glazing structures in accordance with the principles of the present invention.
Figure 5:
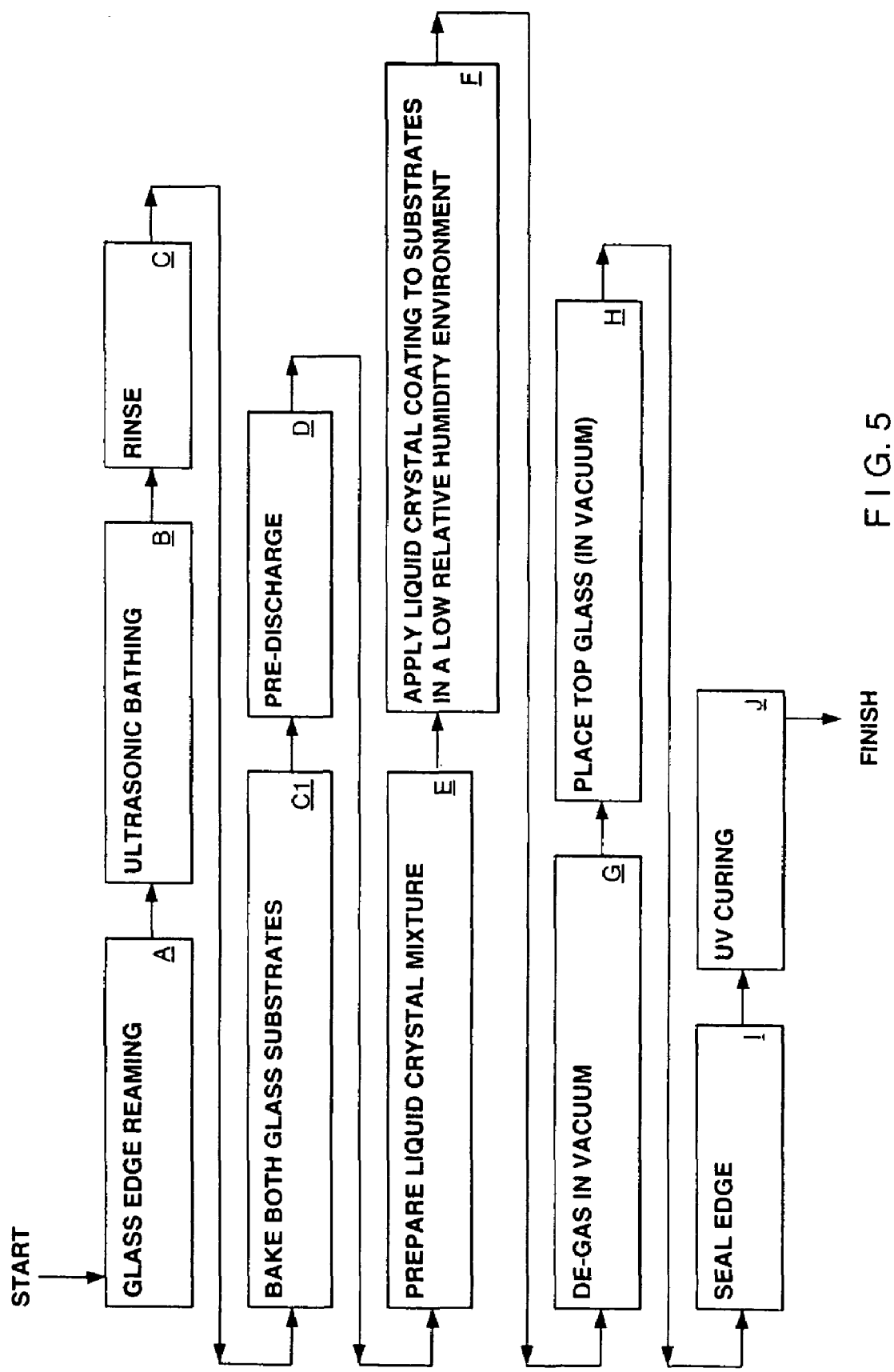
FIG. 5 is a diagram setting forth a flow chart illustrating the steps involved when using the system of FIG. 4 to manufacture low-cost, haze and defect free electro-optical glazing structures hereof using formulation Nos. 1 through 9, and sheets of float-type glass, in accordance with the principles of the present invention.

Referring now to FIGS. 4 and 5, several formulations will now be described for making the electro-optical glazing structure 3 of the present invention using an electrically switchable liquid crystal and polymer blend material which offers significantly lowered manufacturing cost. The material exhibits minimal haze at all viewing angles when in the ON state (i.e. transmission mode). The material is a mixture of non-reactive chiral liquid crystal, a monomer, and small amount of photo-initiator. The advantage is the much lower cost of the monomer material. Unlike all other prior art systems, the present invention utilizes a type of monomer lacking a mesogenic group.

By introducing a polymer network free of mesogenic groups, the coupling between the polymer network and the non-reactive liquid crystal molecules is weaker yet strong enough to stabilize the cholesteric texture in the focal conic state, therefore a modest switching electric field is sufficient to switch all non-reactive liquid crystal molecules along the field direction. The result is a haze free device at all view angles. As an example, one identified monomer from Aldrich is Ethylene Glycol Dimethacrylate (EGD). The monomer is UV polymerizable and has a refractive index of 1.4540 with a chemical structure of $[S_i(CH_3)_2O]_n$. Other UV curable polymers without a mesogenic group have also been identified such as UV10 and UV15-7 from Master Bond (U.S.A.), which can be used for fabricating the PSCT panel. When UV10 and UV15-7 are used to make the device, no photo initiator is added in the liquid and monomer mixture.

The usage of a smaller molecular weight monomer promotes higher cross-linking site density per unit volume. The higher cross-linking density enhances the mechanical strength of the device.

Most low molecular weight nematic liquid crystals have been found suitable for making the invented PSCT device. Single compound liquid crystal such as the K-, and M-series from EMI (Germany), and multiple compound liquid crystals such as the E-, and ZLI-series from EMI are effective. For example, E7, E44 (both from EMI, Germany), and P9615A (from SLICHEM, China) have been successfully used in making such devices.

Chiral additives are necessary to induce a cholesteric phase in PSCT. A chiral component CB15 has been identified from EMI. It is understood that other chiral additives are also useful in making the PSCT devices.

As mentioned previously, in making large size PSCT devices, the flow streaks of the liquid crystal/polymer mixture creates non-uniformity problems. In order to solve this problem, the addition of a small amount of surfactant is helpful for the uniformity as well. The addition of a small amount of Poly(Dimethylsiloxane) (viscosity 5cST) shows drastic improvement in panel uniformity. The function of the surfactant is to modify the surface property of the substrates to reduce the differences in the coupling of the substrates to the various components of the liquid crystal mixture. Therefore, all the components in the mixture flow uniformly and maintain their proper ratio in the mixture, eliminating the flow streaks.

A photo initiator is necessary to initiate the polymerization of the polymer compound in the liquid crystal mixture. Several photo initiators have been identified. They are 2,6-Di-tert-butyl- 4-methylphenol (Aldrich), IG500 (Cyba Geigy), Darocur1173 (D1173) (Cyba Geigy). It is understood that other photo initiators are also useful in making the glazing structure of the present invention.

Formulations for Making the PSCT of the Present Invention

Having identified the preferred ingredients (materials) for making the electro-optical glazing structure of the present invention, it is now appropriate at this juncture to describe in detail several preferred formulations based thereon for making such electro-optical glazing structures.

EXAMPLE 1

| Ingredient | Function | % | Weight(mg) |
| --- | --- | --- | --- |
| Poly(dimethylsiloxane) | Surfactant | 0.01 | 0.1032 |
| 2,6-Di-tert-butyl-4 methylphenol | Photo Initiator | 0.0029 | 0.03 |
| P9615A | Nematic | 89.781 | 926.3 |
| CB15 | Chrial | 7.1821 | 74.1 |
| EGD | Monomer | 3.024 | 31.2 |

EXAMPLE 2

| Ingredient | Function | % | Weight(mg) |
| --- | --- | --- | --- |
| Poly(dimethylsiloxane) | Surfactant | 0.01 | 0.1021 |
| 2,6-Di-tert-butyl-4 methylphenol | Photo Initiator | 0.002 | 0.02 |
| E44 | Nematic | 91.125 | 930.5 |
| CB15 | Chrial | 6.4929 | 66.3 |
| EGD | Monomer | 2.3699 | 24.2 |

EXAMPLE 3

| Ingredient | Function | % | Weight(mg) |
|---|---|---|---|
| Poly(dimethylsiloxane) | Surfactant | 0.01 | 0.10959 |
| IG500 | Photo Initiator | 0.1277 | 1.4 |
| P9615A | Nematic | 90.09 | 987.4 |
| CB15 | Chrial | 7.2627 | 79.6 |
| EGD | Monomer | 2.5091 | 27.5 |

EXAMPLE 4

| Ingredient | Function | % | Weight(mg) |
|---|---|---|---|
| Poly(dimethylsiloxane) | Surfactant | 0.01 | 0.1004 |
| Darocur1173 (D1173) | Photo Initiator | 0.2091 | 2.1 |
| P9615A | Nematic | 89.694 | 900.8 |
| CB15 | Chrial | 7.8463 | 78.8 |
| EGD | monomer | 2.2404 | 22.5 |

EXAMPLE 5

| Ingredient | Function | % |
|---|---|---|
| Poly(dimethylsiloxane) | Surfactant | 0.01 |
| E7 | Nematic | 90 |
| CB15 | Chiral | 7 |
| UV10 | Monomer | 2.99 |

EXAMPLE 6

| Ingredient | Function | % | Weight(g) |
|---|---|---|---|
| Poly(dimethylsiloxane) | Surfactant | 0.01 | 0.0022 |
| D1173 | Photo Initiator | 0.05 | 0.011 |
| P9615A | Nematic | 90 | 19.8 |
| CB15 | Chrial | 7.94 | 1.7468 |
| EGD | Monomer | 2 | 0.44 |

EXAMPLE 7

| Ingredient | Function | Relative Weight Percentage % |
|---|---|---|
| Siloxane | Surfactant | 0.045 |
| D1173 | Photo Initiator | 0.2 |
| TEB300 | Nematic Liquid Crystal | 47 |
| CB15 | Chiral Additive | 10 |
| EGD | Type A Monomer | 5 |
| E44 (EMI) | Nematic Liquid Crystal | 38 |

The above liquid crystal and monomer mixtures can be mixed with dichroic dyes to become colored. For example, three dichroic dyes (D5, D35, and D52) have been identified from EMI. The dosage of the dye in the liquid crystal mixture ranges from 0.5% to >5%. The same fabrication method used for the normal PSCT panel (as will be shown in the next section) can be adopted to make the dyed PSCT. The dyed PSCT panel exhibits a colored non-transparent state when no voltage is applied. However, if an electric field is applied, the dye as well as the liquid crystal molecules are all aligned in the field direction to become a lightly tinted transparent state. Using different dyes can yield different colors. The following is a list of the dyed mixtures for the colored PSCT device.

EXAMPLE 8

| Ingredient | Function | % | Weight(g) |
|---|---|---|---|
| Poly(dimethylsiloxane) | Surfactant | 0.01 | 0.0022 |
| D1173 | Photo Initiator | 0.0498 | 0.011 |
| P9615A | Nematic | 89.552 | 19.8 |
| CB15 | Chrial | 7.9005 | 1.7468 |
| E.G.D. | Monomer | 1.99 | 0.44 |
| D5 | Dye | 0.4975 | 0.11 |

EXAMPLE 9

| Ingredient | Function | % | Weight(g) |
|---|---|---|---|
| Poly(dimethylsiloxane) | Surfactant | 0.01 | 0.0022 |
| D1173 | Photo Initiator | 0.0498 | 0.011 |
| P9615A | Nematic | 89.552 | 19.8 |
| CB15 | Chrial | 7.9005 | 1.7468 |
| E.G.D. | Monomer | 1.99 | 0.44 |
| D35 | Dye | 0.4975 | 0.11 |

Note:
The concentration of dichroic dye D35 can be varied from 0% to 1%.

EXAMPLE 10

| Ingredient | Function | % | Weight(g) |
|---|---|---|---|
| Poly(dimethylsiloxane) | Surfactant | 0.01 | 0.0022 |
| D1173 | Photo Initiator | 0.0499 | 0.011 |
| P9615A | Nematic | 89.776 | 19.8 |
| CB15 | Chrial | 7.9202 | 1.7468 |
| E.G.D. | Monomer | 1.995 | 0.44 |
| D52 | Dye | 0.2494 | 0.055 |

Note:
The concentration of the dichroic dye D52 can be varied from 0% to 0.5%.

Notably, formulation (No. 10) exhibits a lower switching voltage because the nematic liquid crystals have a much larger dielectric anisotropy (for example, $\Delta\epsilon$ of TEB300=29.3 while $\Delta\epsilon$ of TEB 30 is only 9.2).

Selecting and Preparing the Substrates for the Electro-Optical Glazing Structure of the Present Invention In order to make low cost PSCT-based devices in accordance with the present invention, inexpensive glass substrates with an optically clear and electrically conductive layer are preferred. All prior art technologies use special glass substrates that are display standard. Such substrates have expensive Indium-Tin-Oxide (Tin Oxide) coatings that have high conductivity and high optical transmittaince. However, the glass is expensive, making it almost impossible to be used for large size privacy glazing. In order to avoid this shortcoming, equivalent but inexpensive glass must be used. One of the candidates is float glass coated with an inexpensive conductive layer that is optically clear. Such glass has been identified from one vendor (Pilkington/LOF) and used in making the large size (2'×3') PSCT glazing panels. The glass has a Tin-Oxide conductive coating which is chemical vapor deposited (CVD) with a resistance of 1500 Ohm per square. However, other low cost conductive layers are also suitable for this purpose, such as $ZnO_2$, silver, or others.

The float glass has a fairly large variation in both thickness and surface flatness; and very possibly has conductive particles generated during the conductive layer coating deposition process. On the other hand, the low cost liquid crystal materials used have relatively low resistivity. Due to these two major reasons, electric shorting that damages the glazing panel can be a problem. Therefore, an electrically insulating layer is needed on top of the conductive coating on each glass substrate to prevent electric shorts. A thin $SiO_x$ layer will act as the insulating layer. However, in certain cases, if the glass substrates do not have a very large variation in surface flatness and do not have large conductive particles, such an electrically insulating layer is not necessary. However, an optional electric pre-discharge step might be adopted to discard the small size conductive particles. Such a process involves applying an electric voltage (preferably at a value of 4–10 V/micron) across an empty glass cell whose gap is determined by applied bead spacers (e.g. 20 micron beads from Duke Scientific). For example, floating glass substrates from LOF with a CVD deposited Tin Oxide conductive layer have been successfully used in making the invented large size low cost and uniform PSCT device, even though no insulating coating was introduced.

Description of the System and Method of Manufacture According to the First Illustrative Embodiment of the Present Invention In order to make the large size (83"×56") PSCT panel, the system shown in FIG. 4 and the process depicted in FIG. 5 can be used.

As shown at Block A in FIG. 5, glass reaming apparatus 15 is used to smooth the glass edges of the glass substrates. (e.g. 83"×56" sheets of float-type glass TEC-000 from Pilkington) to eliminate the possibility of creating glass chips during the manufacturing process.

As shown in Block B in FIG. 5, ultrasonic bathing apparatus 16 is used to help clean the glass surfaces. This is a standard procedure in display industry. In our procedure, the ultrasonic bath solution contains 4 pounds of Alconox detergent from Alconox, Inc. (U.S.A.) in about 80 gallons of water.

As shown in Block C in FIG. 5, rinsing apparatus 17 is used to help wash away the ultrasonic bath detergent from the glass substrates.

As shown in Block D in FIG. 5, optional pre-discharging apparatus 18 can be used to help remove small conductive, particles from the substrates. This is a new procedure that is not currently used in the industry. The two substrates are separated by a 30 micron bead spacer. Then a 280V voltage is applied between the two substrates for several minutes. If there are small conductive particles, they will be eliminated by the electric sparking of the high electric field.

As shown in Block E in FIG. 5, liquid crystal mixture apparatus 19 is used to prepare the liquid crystal and polymer mixture according to one of the selected formulations (i.e. recipes) described hereinabove.

As shown in Block F in FIG. 5, liquid crystal coating apparatus 20 is used to apply the liquid crystal and polymer mixture onto the substrate surface. Mechanical spread or knife coating is suitable for this step of the process.

As shown in Block G in FIG. 5, de-gassing apparatus 21 is used to help remove the air bubbles from the coated liquid crystal mixture in a vacuum chamber of a pressure around $10^{-2}$ Torr.

As shown in Block H in FIG. 5, apparatus 22 is used to place the top glass plate upon and thus cover the liquid crystal mixture, e.g. using mechanical solenoid apparatus mounted inside the vacuum chamber.

As shown in Block I in FIG. 5, after the liquid crystal is fully filled, edge sealing apparatus 23 is used to seal the four edges of the plate assembly using a suitable epoxy.

As shown in Block J in FIG. 5, UV light curing apparatus 24 is used to apply UV light (365 nm; 3 $W/m^2$) to the sealed glass plate assembly (e.g. glazing structure) in order to cure the panel for about one hour with the voltage (about 120V) switched on.

Improved Formulations for Making the PSCT-Based Electro-Optical Structures of the Present Invention The above-described set of materials and formulations (Nos. 1 through 10) for making the electro-optical glazing structure of the present invention have been found to produce PSCT-based electro-optical glazing panels having good optical performance characteristics, although at times requiring enhancements in terms of long-term mechanical stability. Also, Applicants have discovered that, during panel manufacture, it is important that the polymer and liquid crystal materials flow at substantially the same rate, and if they do not, then aggregation of material will result and non-uniform characteristics in the PSCT structure will occur, producing levels of haze that might be unacceptable in many applications.

Recognizing the above-described problems, Applicants have developed another set of formulations (Nos. 10 through 13) which effectively solve these problems by using novel PSCT formulations.

EXAMPLE 11

| Ingredient | Function | Relative Weight Percentage % |
| --- | --- | --- |
| Siloxane | Surfactant | 0.01 |
| Norland 61 | Type B Monomer | 2.5 |
| TEB30 | Nematic lc | 86.2 |
| CB15 | Chiral additive | 9 |
| EGD | Type A Monomer | 2.3 |

EXAMPLE 12

| Ingredient | Function | Relative Weight Percentage % |
| --- | --- | --- |
| Siloxane | Surfactant | 0.01 |
| Norland 61 | Type B Monomer | 2.5 |

-continued

| Ingredient | Function | Relative Weight Percentage % |
|---|---|---|
| TEB30 | Nematic Liquid Crystal | 85.9 |
| CB15 | Chiral Additive | 9 |
| EGD | Type A Monomer | 2.3 |
| D5 | Blue Dichroic Dye | 0.3 |

EXAMPLE 13

| Ingredient | Function | Relative Weight Percentage % |
|---|---|---|
| Siloxane | Surfactant | 0.01 |
| Norland 61 | Type B | 2.5 |
| TEB30 | Nematic | 85.9 |
| CB15 | Chiral | 9 |
| EGD | Type A Monomer | 2.3 |
| D35 | Purple Dichoric Dye | 0.3 |

As indicated in the above formulation/function tables, each of these formulations contain two different types of monomers which, hereinafter, are referred to as type-A monomers and type-B monomers.

In accordance with the principles of the present invention, type-A monomers contain only one polymerizable group, and when polymerized, produce a 1-D or 2-D like polymer matrix structure having a refractive index that is lower than the refractive index of the liquid crystal (LC) materials contained in the formulated mixture, thus increasing the likelihood of "haze" produced by the resulting PSCT-based device when it is operated in its light transmission state, due to undesired light scattering caused by this mismatch in indices of refraction of the liquid crystal material and the constituent Type-A monomer material. Notably, type A monomers have viscosity characteristics that are lower than the viscosity characteristics of the liquid crystal material employed in the formulation.

In contrast, type-B monomers contain multiple polymerizable groups, and when polymerized, produce a 3-D like polymer matrix structure having a refractive index that is very close to the refractive index of the liquid crystal (LC) materials contained in the formulated mixture, thus reducing the likelihood of haze produced by the resulting PSCT-based device when it is operated in its light transmission state, due to a matching of the indices of refraction of the liquid crystal material and the constituent Type-A monomer material. Notably, type B monomers have viscosity characteristics that are higher than the viscosity characteristics of the liquid crystal material employed in the formulation.

By using type A and type B monomers as described above, Applicants have formulated a mixture that: (1) has components which flow at substantially the same rates during panel manufacture, thereby reducing the aggregation of material along the panel structure and thus resulting in substantially uniform if optical characteristics along the surface of the resulting PSCT-based panel; and (2) results in a PCST structure having (i) significantly reduced levels of haze during total transmission modes of operation, thereby improving the see-through viewing experience for viewers, and (ii) enhanced long-term mechanical stability by virtue of the combined 1-D/2-D and 3-D polymer matrix structure, within which the liquid crystal material is embodied. By virtue of this enhanced mechanical stability of the PSCT of the present invention, it is less likely to develop non-switchable spots due to gravity after a long time sitting.

Description of the System and Method of Manufacture According to the First Illustrative Embodiment of the Present Invention In order to make a large size (83"×56") PSCT panel employing the improved formulations (Nos. 11–13) described above, the system shown in FIG. 4 and the process depicted in FIGS. 6A through 6D can be used. For purposes of illustration, the manufacturing process described below involves using any of the improved formulations or recipes (Nos. 11–13) set forth above.

As a general, note, during the panel manufacturing process of the present invention, it is important that the relative humidity of the manufacturing environment is maintained relative low, as it has been discovered that water molecules tend to adversely effect the optical properties and characteristics of the PSCT-based panel structures. Thus, if necessary, the manufacturing environment may need to be de-humidified down to 40% relative humidity using stand-alone de-humidifiers, while maintaining the environment temperature is maintained below 27 Celsius.

LC Mixture Preparation

Figure 6A:
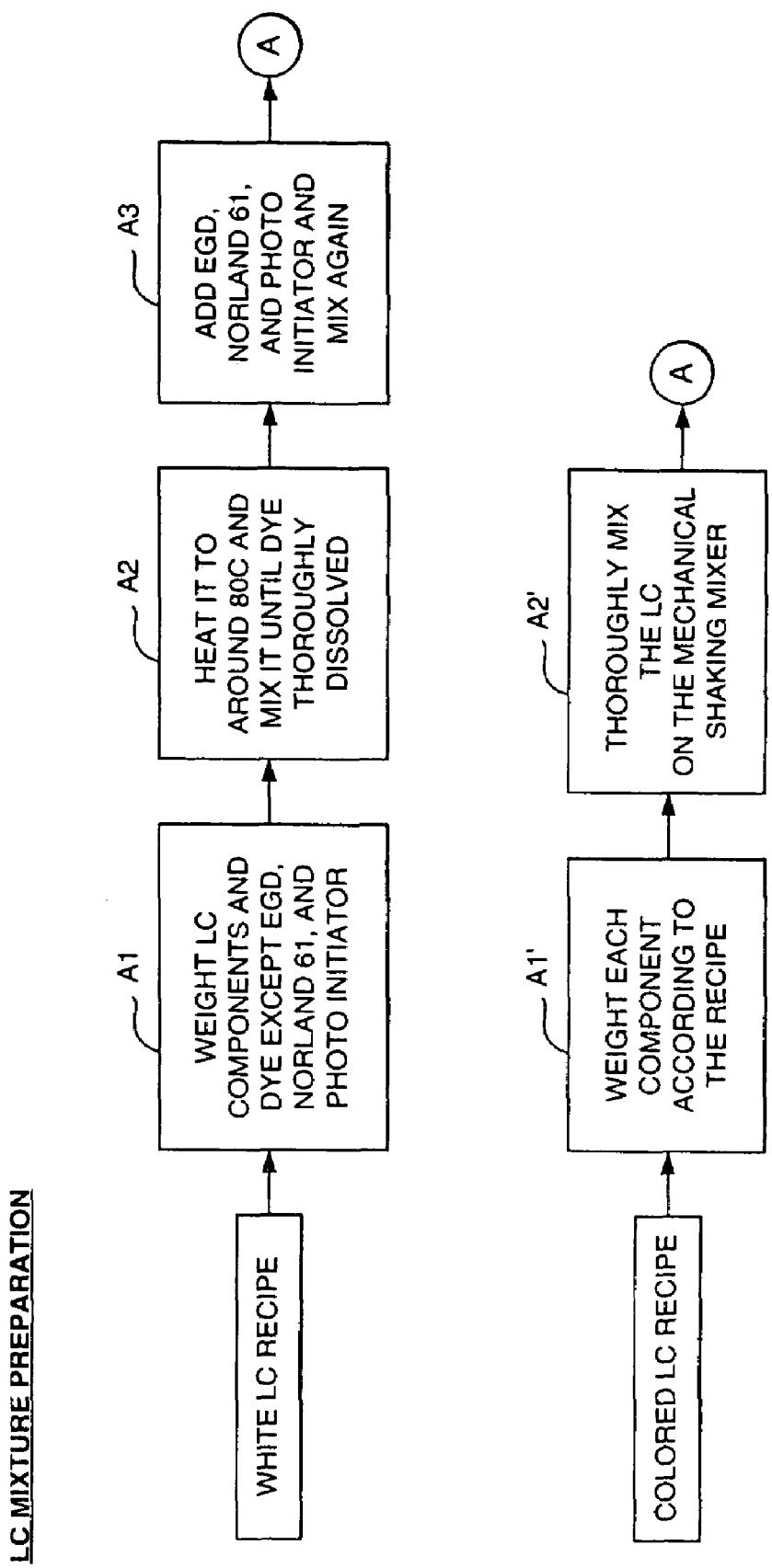
FIGS. 6A through 6D, taken together, provide a diagram setting forth a flow chart illustrating the steps involved when using the system of FIG. 4 to manufacture low-cost, haze and defect free electro-optical glazing structures hereof using the formulation Nos. 10 through 13, and sheets of float-type glass, in accordance with the principles of the present invention.

At Blocks A1, A2 and A3 in FIG. 6A, a procedure is described for preparing the LC mixture for "white-type" PSCT panel structures. At Blocks A1' and A2' in FIG. 6A, a procedure is described for preparing the PSCT material mixture for "color-type" PSCT panel structures.

Glass Substrate Preparation

Figure 6B:
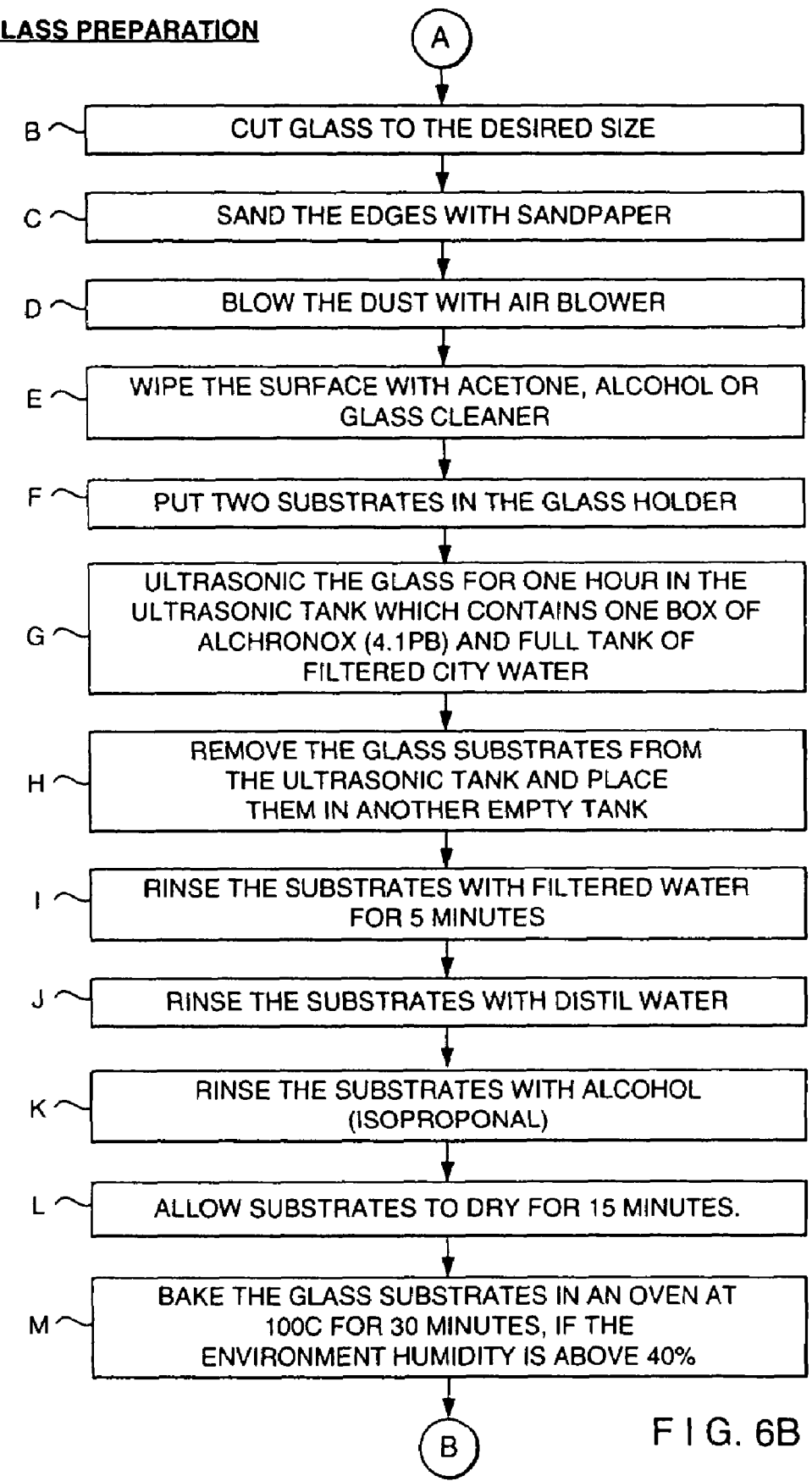

As indicated at Block B in FIG. 6B, the sheets of float-type glass (by Pilkington), to which an electrically-conductive optically-clear layer has been preapplied, are cut to the desired size. During such cutting operations, technicians must wear a protective suit, shoe covers and gloves.

As indicated at Block C in FIG. 6B, the edges of these glass panels are sanded with sandpaper.

As indicated at Block D in FIG. 6B, the glass dust produced by sanding operations is then blown off the substrates using an air blower.

As indicated at Block E in FIG. 6B, the surfaces of the sanded substrates are wiped off using acetone, alcohol or glass cleaner.

As indicated at Block F in FIG. 6B, two glass substrates are placed in a glass holder for handling operations.

As indicated at Block G in FIG. 6B, the glass substrates are ultrasonically treated for one hour in the ultrasonic tank which contains one box of Alchronox (4.1 pb) and full tank of filtered water.

As indicated at Block H in FIG. 6B, the glass substrates are removed from the ultrasonic tank and placed into another empty tank.

As indicated at Block I in FIG. 6B, the glass substrates are rinsed with filtered water for 5 minutes.

As indicated at Block J in FIG. 6B, the glass substrates are rinsed with distilled water.

As indicated at Block K in FIG. 6B, the glass substrates are rinsed with alcohol (isoproponal).

As indicated at Block L in FIG. 6B, the glass substrates are allowed to dry for 15 minutes.

As indicated at Block M in FIG. 6B, the glass substrates are then baked in a temperature-controlled oven at 100° C. for 30 minute, if the environment humidity is above 40%.

Mating of Glass Substrates within Vacuum Chamber

Figure 6C:
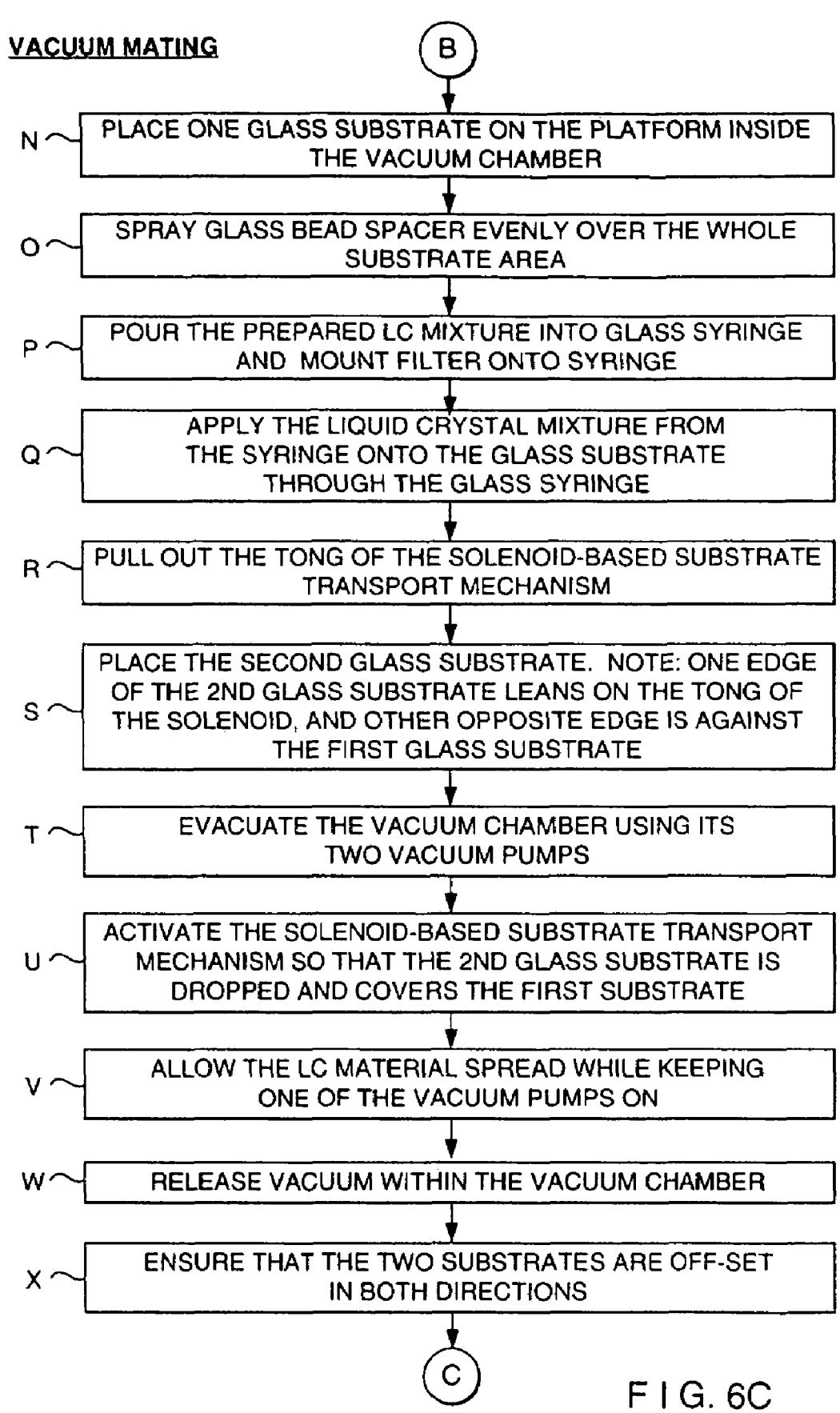

As indicated at Block N in FIG. 6C, one glass substrate is placed on a platform set up inside the vacuum chamber.

As indicated at Block O in FIG. 6C, glass bead spacer material is sprayed evenly over the whole ITO-coated surface of the glass substrate.

As indicated at Block P in FIG. 6C, the prepared LC mixture is poured into a glass syringe device or functionally equivalent device, and thereafter a filter is mounted onto the syringe device.

As indicated at Block Q in FIG. 6C, the liquid crystal mixture with the onto the glass substrate through the glass syringe.

As indicated at Block R in FIG. 6C, the tong of the solenoid-based substrate transport mechanism within the vacuum chamber device is retracted and ready for engagement with the other of the substrates.

As indicated at Block S in FIG. 6C, the second glass substrate is placed onto the first (fixed) glass beaded substrate so that one edge of the second glass substrate leans on the tong of the solenoid-based transport mechanism, and other opposite edge thereof is disposed against the first glass substrate.

As indicated at Block T in FIG. 6C, the two vacuum pumps in the vacuum chamber are operated to commerce evacuation of the interior volume of the vacuum chamber within which the mated glass panels are located. The pumping time should not be more than 20 minutes. The interior vacuum level of 100–200 micron vacuum is desired.

As indicated at Block U in FIG. 6C, the solenoid-based substrate transport mechanism within the vacuum chamber is activated so that the second glass substrate is dropped and covers the first substrate.

As indicated at Block V in FIG. 6C, the applied PSCT material mixture is allowed to spread between the mated substrates while one of the vacuum pumps is maintained operational. This spreading process, occurring under the forces of gravity, usually takes 1–2 hours for the PSCT material mixture to fill the whole area between the mated glass substrates.

As indicated at Block W in FIG. 6C, vacuum within the vacuum chamber is released using the vacuum releasing valve provided on the vacuum chamber.

As indicated at Block X in FIG. 6C, efforts are taken to ensure that the two substrates are off-set in both directions, providing surfaces onto which electrically-conductive electrodes can be subsequently attached in a conventional manner by soldering or the like.

Sealing the Edges of the PSCT-Based Panel

Figure 6D:
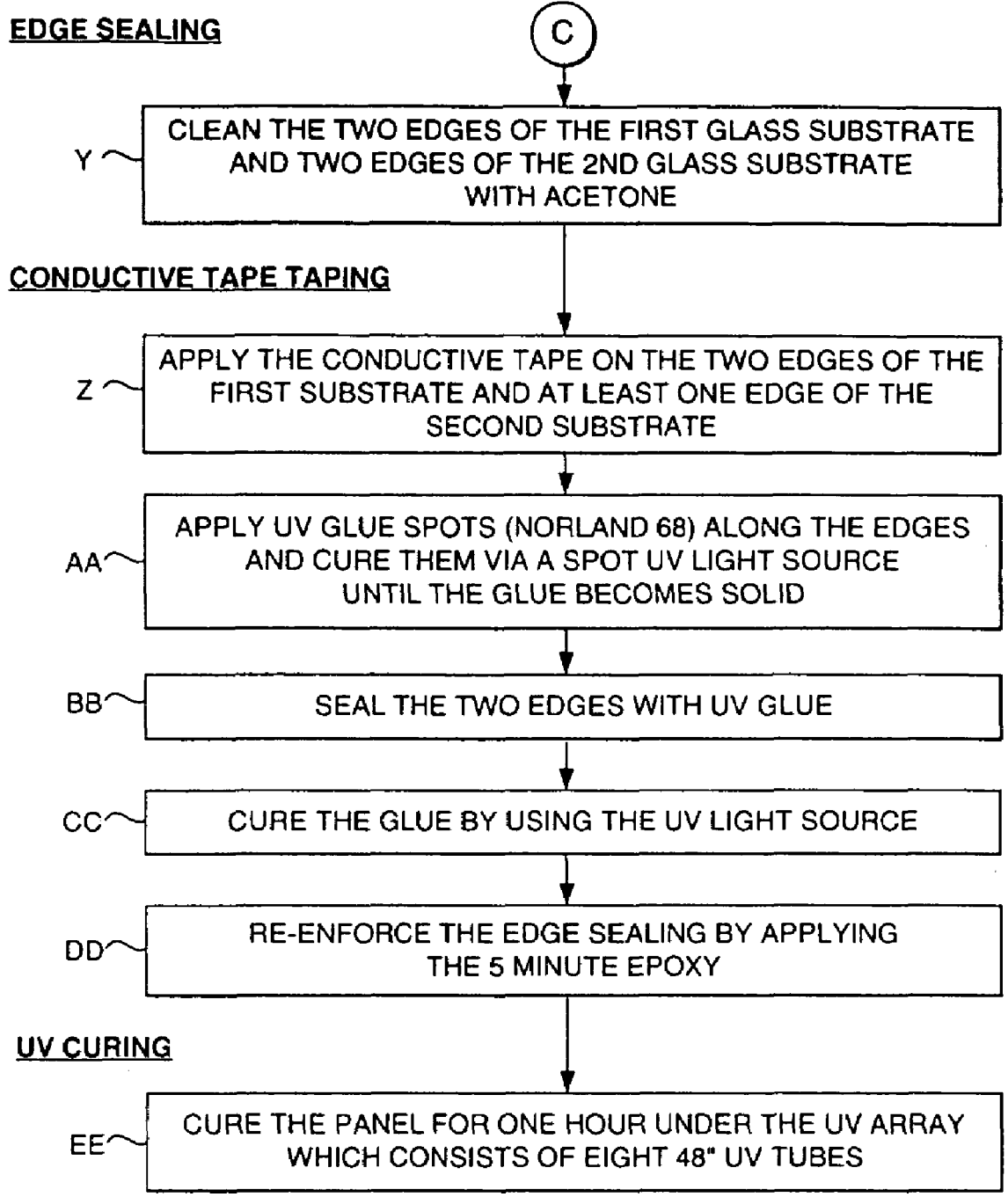

As indicated at Block Y in FIG. 6D, the two edges of the first glass substrate and two edges of the second glass substrate are cleaned with acetone, with care taken to not use too much acetone during this cleaning step.

Taping the Edges of the Panel with Conductive Tape

As indicated at Block Z in FIG. 6D, conductive tape is applied to the two edges of the first substrate and at least one edge of the second substrate.

As indicated at Block AA in FIG. 6D, spots of UV glue (e.g. Norland 68) are applied along the edges of the substrates and are then cured via a spot UV light source until the applied glue becomes solid. During curing operations, a 110 voltage must be applied to the panel through the conductive tape. The function of the applied electric field is to force the liquid crystals inside, the PSCT mixture to be aligned along the applied field direction. Notably, the applied voltage is not removed right after curing, but is maintained for at least 10 minutes.

As indicated at Block BB in FIG. 6D, the two edges of the substrates are sealed with a UV glue (e.g. Norland 68). This UV glue can be applied using a plastic syringe or functionally equivalent device.

As indicated at Block CC in FIG. 6D, the applied UV glue is then cured using the UV light source. As described above, during curing operations, a 110 voltage must be applied to the panel through the conductive tape. The function of the applied electric field is to force the liquid crystals inside the PSCT mixture to be aligned along the applied field direction. The applied voltage is, not removed right after curing, but is maintained for at least 10 minutes.

As indicated at Block DD in FIG. 6D, the sealed edge is reinforced by applying a 5-minute epoxy thereto. The epoxy should be allowed to dry for at least 30 minutes to fully dry.

Curing the Panel Using UV Light

As indicated at Block EE in FIG. 6D, the panel is then cured for one hour under an UV array consisting, for example, eight 48" UV tubes set up in a clean room environment. During such UV curing operations, a 110 voltage must be applied to the panel through the conductive tape. The function of the applied electric field is to force the liquid crystals inside, the PSCT mixture to be aligned along the applied field direction. The applied voltage is not removed right after curing, but is maintained for at least 10 minutes.

Final Cleaning

After the panel has been cured, it is then cleaned a final time and then tested to ensure quality control measures are maintained during the manufacturing process.

During the course of fabricating PSCT-based window panel of the present invention, Applicants have discovered three factors which can cause the PSCT panel to not hold its scattering state of operation, namely: (a) the presence of moisture (i.e. a free radical terminator) within the panel manufacturing environment; (b) the release of gas from some components from the paint, such as naphthalene which is a prohibitor, and (c) evaporation of the monomer components within the applied LC mixture during the evacuation process. Applicants have also discovered that solutions to these three problems are: (a) bake the glass substrate and de-humidify the environment; (b) strip off the paint, and (c) shorten the pumping time.

System for and Method of Making PSCT-Based Devices Having Plastic Substrates in Accordance with the Present Invention In architecture and automobile application, the use of PSCT panels having glass substrates will not satisfy safety glass criteria, because once the glass substrate is broken, its sharp edge may injure people.

One possible solution to this problem is to make the PSCT panel of the present invention in a laminated manner, namely: make the PSCT on plastic substrates, and then laminate the PSCT structure onto a glass substrate using strong adhesives such as PVB adhesives used during the manufacture of laminated automobile windshields and windscreens.

Figure 7:
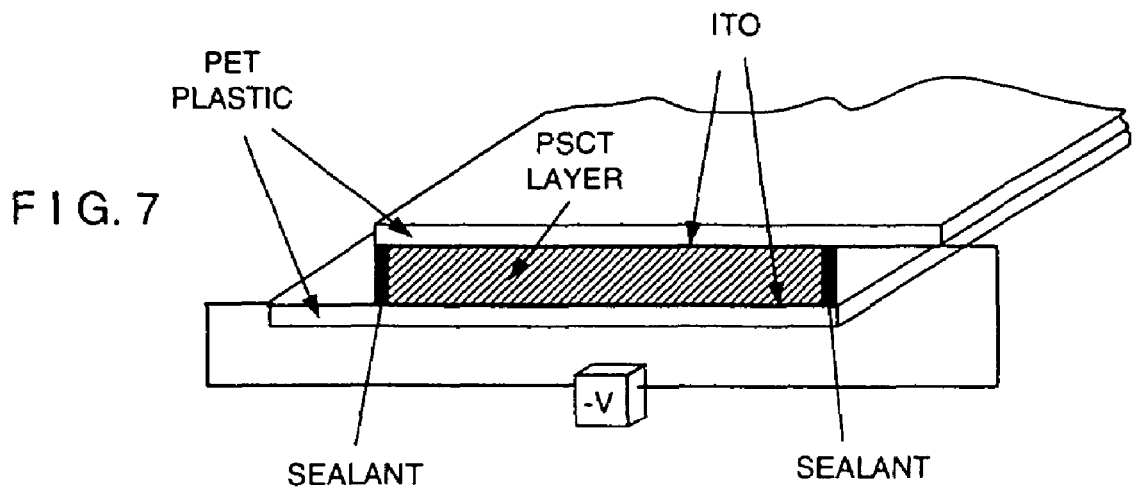
FIG. 7 is a perspective, partially broken away view of an illustrative embodiment of the electro-optical glazing structure of the present invention, in which the PSCT material is contained between a pair of PET-type plastic substrate panels in accordance with the principles of the present invention.

In FIG. 7, a PSCT-based panel having PET plastic substrates is shown. In general, all of the above-described formulation (Nos. 1–13) can be used to make such a panel.

For purposes of illustration, a method of making this PET-based PSCT panel will be described below using formulation No. 11, in which a "white" panel is produced when the PSCT device is operated in its "OFF" state. The general apparatus of FIG. 8 can be used. Notably, when using PET plastic substrates, there is no need for the use of an evacuation chamber, although the PET panels should be baked to drive off moisture, and the manufacturing process should be carried out in low relative humidity environment, as in the case of manufacturing PSCT panels having glass substrates.

Notably, before Block A, the PET substrates are prepared, coated with an electrically-conductive optically-clear layer (e.g. ITO) over entire surface of one of its sides, baked to drive off moisture from within its microstructure, and then set aside for use in the following manufacturing operations.

Figure 9:
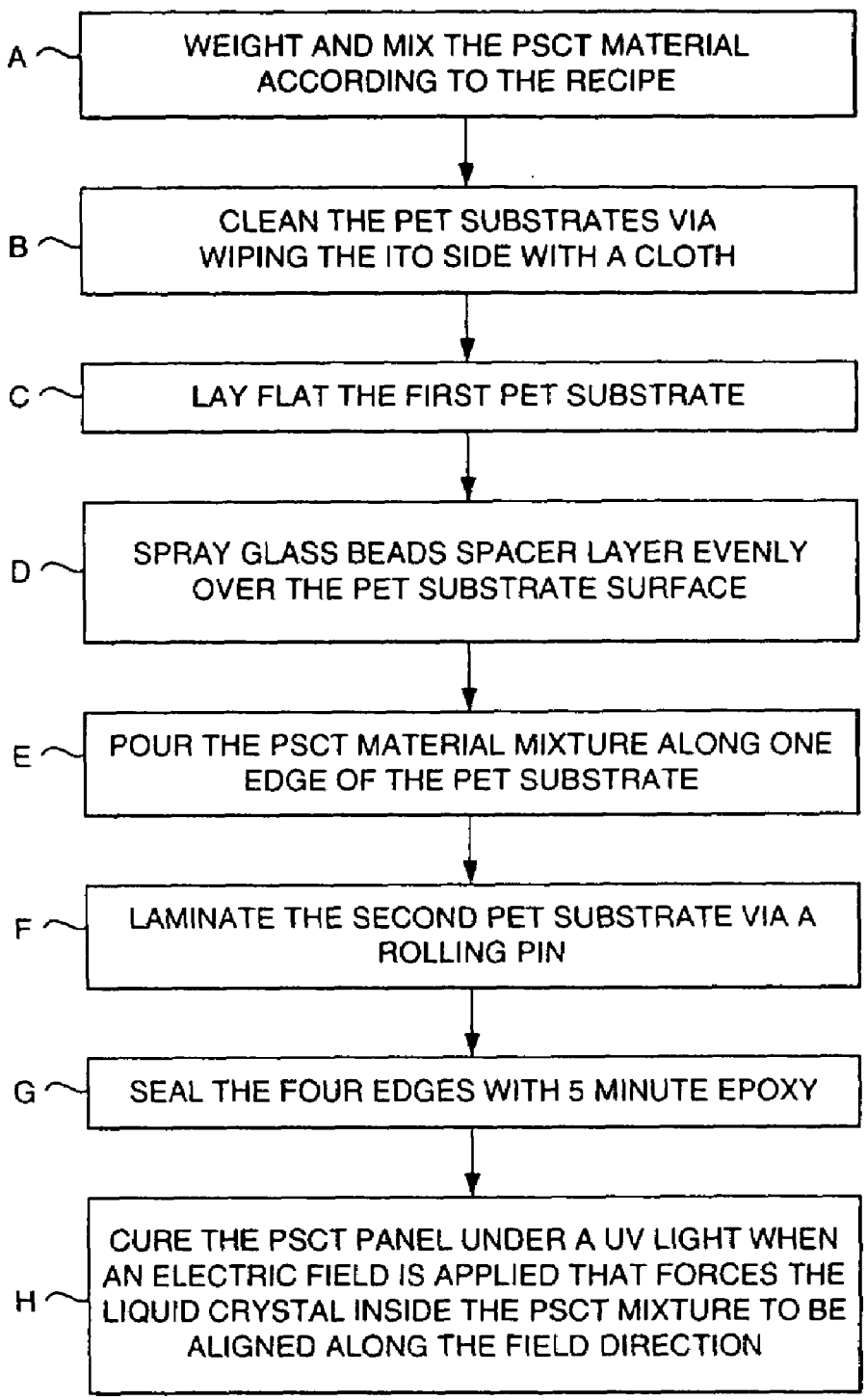
FIG. 9 provides a diagram setting forth a flow chart illustrating the steps involved when using the system of FIG. 4 to manufacture low-cost, haze and defect free electro-optical glazing structures hereof using the formulation Nos. 10 through 13, and sheets of float-type glass, in accordance with the principles of the present invention.

As indicated at Block A in FIG. 9, components for the PSCT material are weighed and mixed according to the formulation No. 11, or other formulation.

As indicated at Block B in FIG. 9, the PET substrates are cleaned by wiping the ITO coated side using a cloth.

Figure 8:
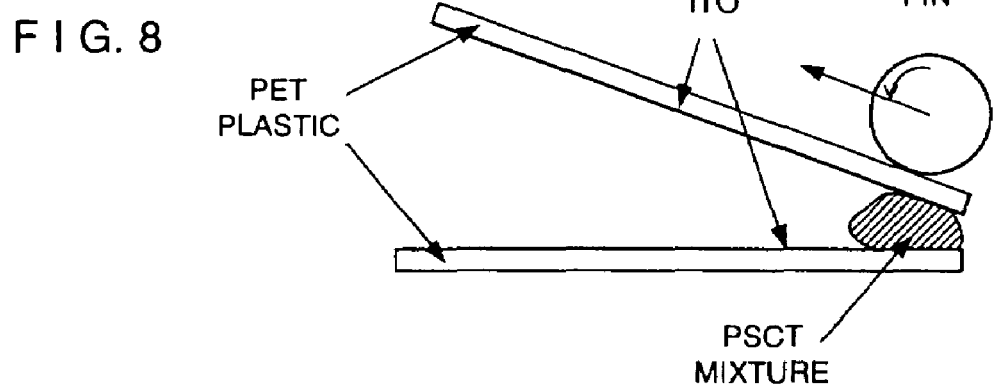
FIG. 8 is a schematic representation of a system for use in manufacturing the electro-optical glazing structure of FIG. 7, during which a rolling-type mechanism is employed to apply pressure uniformly upon a pair of PET-type plastic panels, between which a predetermined amount of PSCT material has been deposited in accordance with the principles of the present invention.

As indicated at Block C in FIG. 9, the first PET substrate is positioned on a flat surface, as shown in FIG. 8.

As indicated at Block D in FIG. 9, the entire ITO coated surface of the PET substrate is sprayed with glass bead spacer layer (e.g. having a diameter of 30 microns) evenly over the substrate surface.

As indicated at Block E in FIG. 9, the PSCT material mixture is poured or otherwise deposited along one edge of the PET substrate.

As indicated at Block F in FIG. 9, the second PET substrate is laminated on the first PET substrated using a wet rolling-pin type mechanism, as shown in FIG. 8, or other mechanism for evenly applying pressure upon the upper surface of the second PET substrate during the lamination operation.

As indicated in Block G in FIG. 9, the four edges of the PET substrates are then sealed using 5 minute epoxy which is permitted at least 30 minutes to fully dry.

As indicated in Block H in FIG. 9, the PSCT panel is then cured under a UV light while an electric field is applied across the IPT layers in manner similar to that performed in connection with the manufacturing process for glass substrate PSCT panels, described above. The applied electric field forces the liquid crystal inside the PSCT mixture to be aligned along the applied field direction.

After curing is completed, the resulting panel is cleaned once again and then put through testing and other quality control measures known in the art.

The PSCT-based panel having PET plastic substrates described above can be integrated into various types of electro-optical devices and systems, or may be laminated onto glass substrates of various sorts, as practiced in the building architecture and automotive industries.

Electrically-Switchable Edge-Lit PSCT-Based Signage Panel of the First Illustrative Embodiment of the Present Invention The PSCT panel of the present invention described above can be modified, to visually produce a signage work under electronic control by (i) geometrically patterning the first electrically-conductive optically-clear electrode layer into an imaging-conveying portion and a background portion, while unpatterning the second first electrically-conductive optically-clear electrode layer, and (ii) providing a dual set of control switches (K1 and K2) that apply different control voltages (from a voltage source V) to different portions of the electrically-conductive optically-clear electrode layers in the device. The function of these control voltages is to cause the liquid crystals to align in either their focal conic state (i.e. during the translucent state of panel operation) or homeotropic state (i.e. during the transparent state of panel operation).

Figure 10:
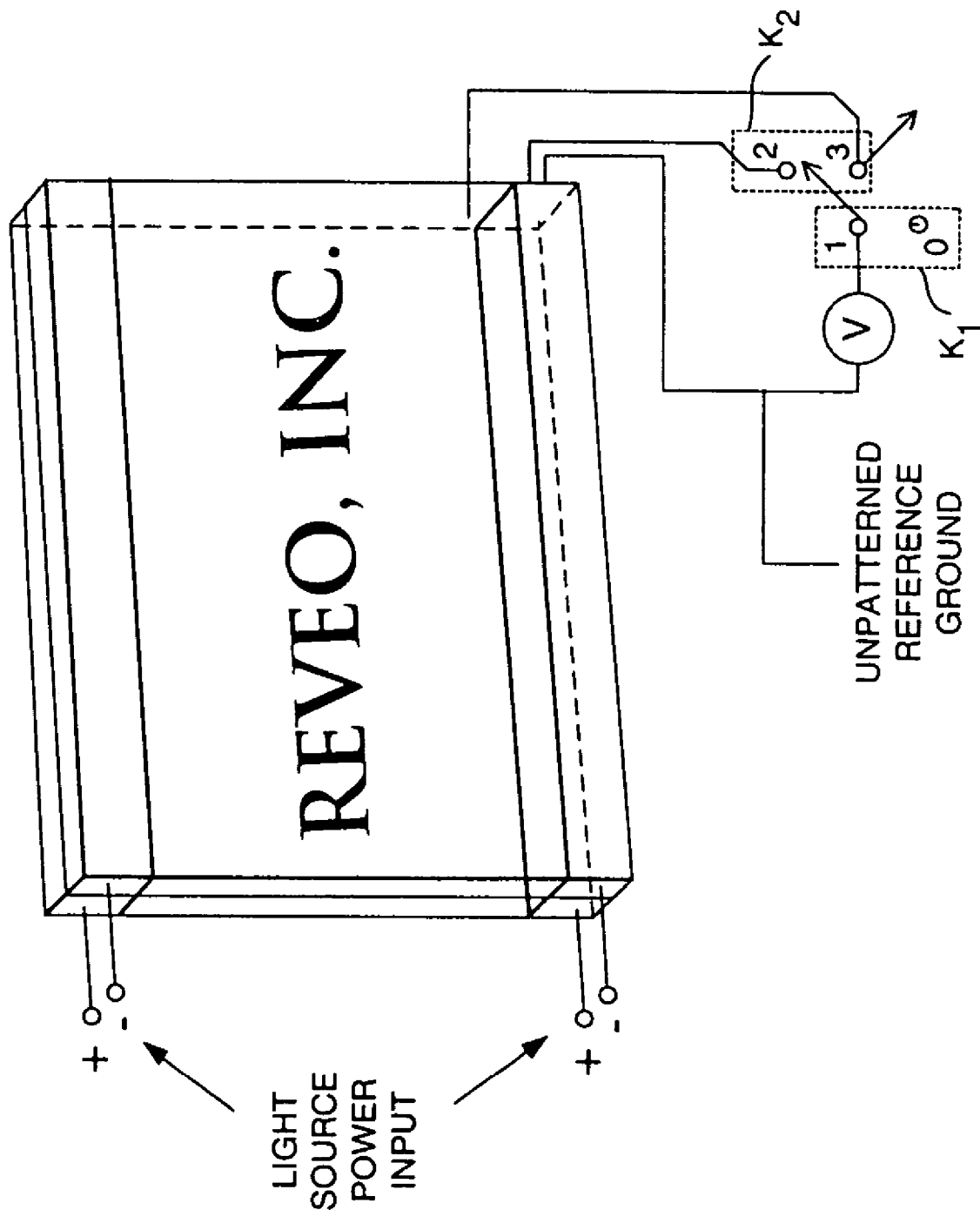
FIG. 10 is a perspective view of an illustrative embodiment of an edge-lit electro-optical PSCT-based signage system of the present invention employing a PSCT-based glazing panel having electrically-conductive layers that are geometrically patterned so as to correspond to signage work to be displayed accordance with material is contained between a pair of PET-type plastic substrate panels in accordance with the principles of the present invention.
Figures 13, 14:
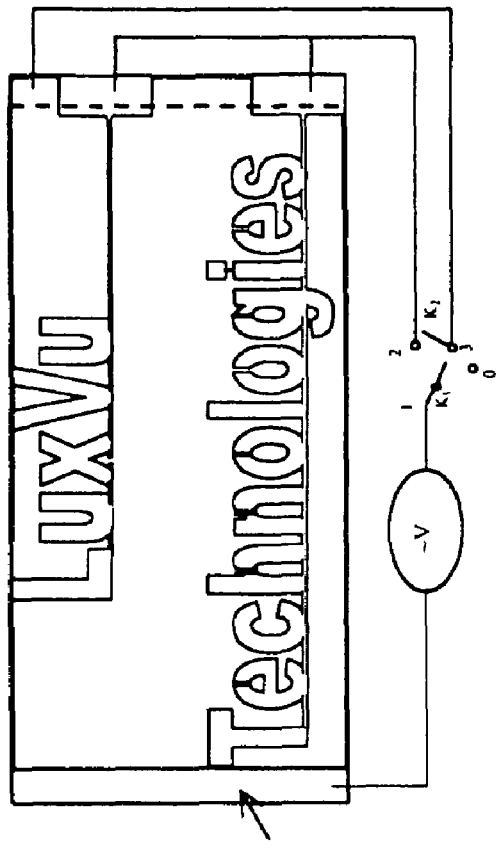
FIG. 13 is a schematic representation of the electrical configuration of the PSCT-based signage panel of FIG. 10, but illustrated with a different signage work than that expressed in the panel of FIG. 10.
FIG. 14 is a table listing the various states of operation of the PSCT-based signage panel shown in FIGS. 10 and 13, and the states of the electrical switches (K1 and K2) which, when configured, electrically-switch particular states into physical operation.

In FIG. 10, an exemplary electro-optical lighting/signage panel is shown, wherein the first electrically-conductive optically-clear electrode (ITO) layer on the first glass (or plastic) substrate is geometrically patterned using a photolithographic method (and the making pattern shown in FIG. 12), whereas the second electrically-conductive optically-clear electrode layer on the second glass (or plastic) substrate is non-patterned. As shown in FIGS. 12 and 13, the geometrically patterned ITO layer on the first glass substrate is created in a non-pixelated fashion.

As shown in FIGS. 10, and 13, the non-patterned ITO layer is electrically connected to a common ground reference voltage. In the illustrative embodiment, the geometrically patterned layer consists of (i) an image-conveying portion (e.g. corresponding to "REVEO, INC." in the case of FIGS. 10 and 11, and "LUX VU TECNOLOGIES" in the case of FIGS. 12 and 13), and (ii) a background portion which is the logical (spatial) compliment of the image-conveying portion. As shown in FIGS. 10 and 13, the image-conveying portion of the first patterned ITO layer is electrically connected to terminal K2=2, whereas the background portion is electrically connected to terminal K2=3. The first control switch K1 is connected to the positive output terminal of the voltage source V, while its terminal 1 may connect with either terminals 2 or 3 of switch K2 or with it terminal 0, thus creating a number of possible switching states with the dual switching configuration.

The different states of operation that are configurable in the PSCT panel of this illustrative embodiment are listed in FIG. 14, and summarized below: (1) producing a light scattering (i.e. darkened) image-conveying pattern against a light transparent (i.e. illuminated) background, as shown in FIG. 11A; (2) producing a light transparent (i.e. illuminated) image-conveying pattern against a light scattering (i.e. darkened) background, as shown in FIG. 11B; the whole panel can be in a transparent state without showing the image-conveying pattern, as shown in FIG. 11C; and the whole panel can be in a light scattering state without showing the image-conveying pattern, as shown in FIG. 11D. These different states can be electronically switched into operation by configuring switches K1 and K2, as indicated the switching table of FIG. 14.

A preferred method manufacturing the PSCT-based electro-optical signage device of the illustrative embodiment will be described below.

Creation of the Photo Mask

The first step of the illustrative method involves creating a photo mask, as shown in FIG. 12, for use making the patterned electrically-conductive optically-clear layer on the first glass) or plastic substrate. Applicants have discovered that during the UV curing step, the whole PSCT panel must be applied with a sufficient voltage; otherwise, the area which is not applied with a voltage will not show exhibit a strong enough light scattering density, making the area look semi-transparent. Therefore, it is very important to create a photo mask that allows the whole panel to be applied with a voltage after the electrode is patterned. In FIG. 12, such a photo mask is shown for the exemplary signage device illustrated in FIG. 13. Photo mask for making the signage device of FIG. 10 would be created following similar geometrical principles. Once the photo mask has been created, the next step of the manufacturing process involves patterning the first ITO layer using photolithographic techniques. At this stage of the process, there are at least two options: photolithography via photoresist, or via UV glue. Both of these techniques will be described below.

Photolithography Using Photo Resist Based Etching Techniques

The general procedure described below can be used to pattern ITO coated substrates made of glass or plastic. A negative photo resist should be used. Such a photo resist has the property that its UV exposed part will be polymerized. However, the unexposed part will be washed out by a special developer.

This photo resist based patterning process involves:

(1) coating photo resist on ITO substrate (e.g. using a spin coating process);

(2) soft-baking the photo resist at a temperature usually specified by the photo resist supplier;

(3) exposing the photo resist to UV light of sufficient intensity while the photo mask is mounted over the top of the substrate;

(4) developing the exposed photo resist in a developer supplied by the photo resist supplier, for a developing time specified by the photo resist supplier (after developing, the unexposed photo resist will be washed out, leaving a patterned photo resist on the ITO substrate surface);

(5) hard-baking the patterned substrate at a baking temperature suggested by the photo resist supplier;

(6) etching the ITO substrate in an etcher which consists of $HCl:N_2 SO_5:H_2O=0.5:0.1:0.5$, for an etching time in the range of 10 to 30 minutes or so; and (7) striping the photo resist using the striper supplied by manufacturer/vendor of the photo resist.

Photolithography Using UV Glue and Lamination Techniques

This UV glue based patterning process involves:

(1) Laminating UV glue between an ITO glass substrate and a UTV transparent plastic substrate (e.g. the UV glue can be Norland 68 from Norland and the plastic substrate can be a non-sticky plastic sheet used to cover a double stick adhesive film);

(2) exposing the UV glue layer to UV light of sufficient intensity (e.g. from a medium pressure mercury UV light source) for an exposure time of about 30 seconds, while the photo mask is mounted on top of the plastic substrate;

(3) pealing off the non-sticky plastic sheet;

(4) wiping out the unpolymerized UV glue using alcohol;

(5) etching the ITO substrate in an etchant (e.g. consisting of $HCl:N_2SO_5:H_2O=0.5:0.1:0.5$) for an etching time in a range of 10 to 30 minutes or so; and (6) Striping the UV glue with acetone.

Fabrication Processes for Making the Electrically-Switchable Edge-Lit PSCT-Based Signage Panel of the First Illustrative Embodiment of the Present Invention At this stage of, the manufacturing process, the vacuum-filling based method of panel construction, described in FIGS. 4 through 6D above, can be used to complete the construction of the PSCT-based signage panel of FIG. 10 through 13, realized between a first glass substrate and a second glass substrate, without requiring modification to the vacuum-filling method.

Similarly, at this stage of the manufacturing process, the lamination/wet-rolling based method of panel construction, described in FIGS. 8 and 9 above, can be used to complete the construction of the PSCT-based signage panel of FIGS. 10 through 13, realized between a glass substrate and a plastic substrate, without requiring modification to the lamination/wet-rolling method.

After the PSCT panel has been assembled, cold cathode fluorescent lighting (CCFL) tubes with reflectors are mounted on the edge of the panel using techniques know in the edge-lit backlighting panel art so that light emitted from these CCFL tubes is efficiently coupled into the waveguiding PSCT structure. Thereafter, electrical switches K1 and K2 can be connected to the panel using techniques known in the LCD panel construction art.

Figure 15:
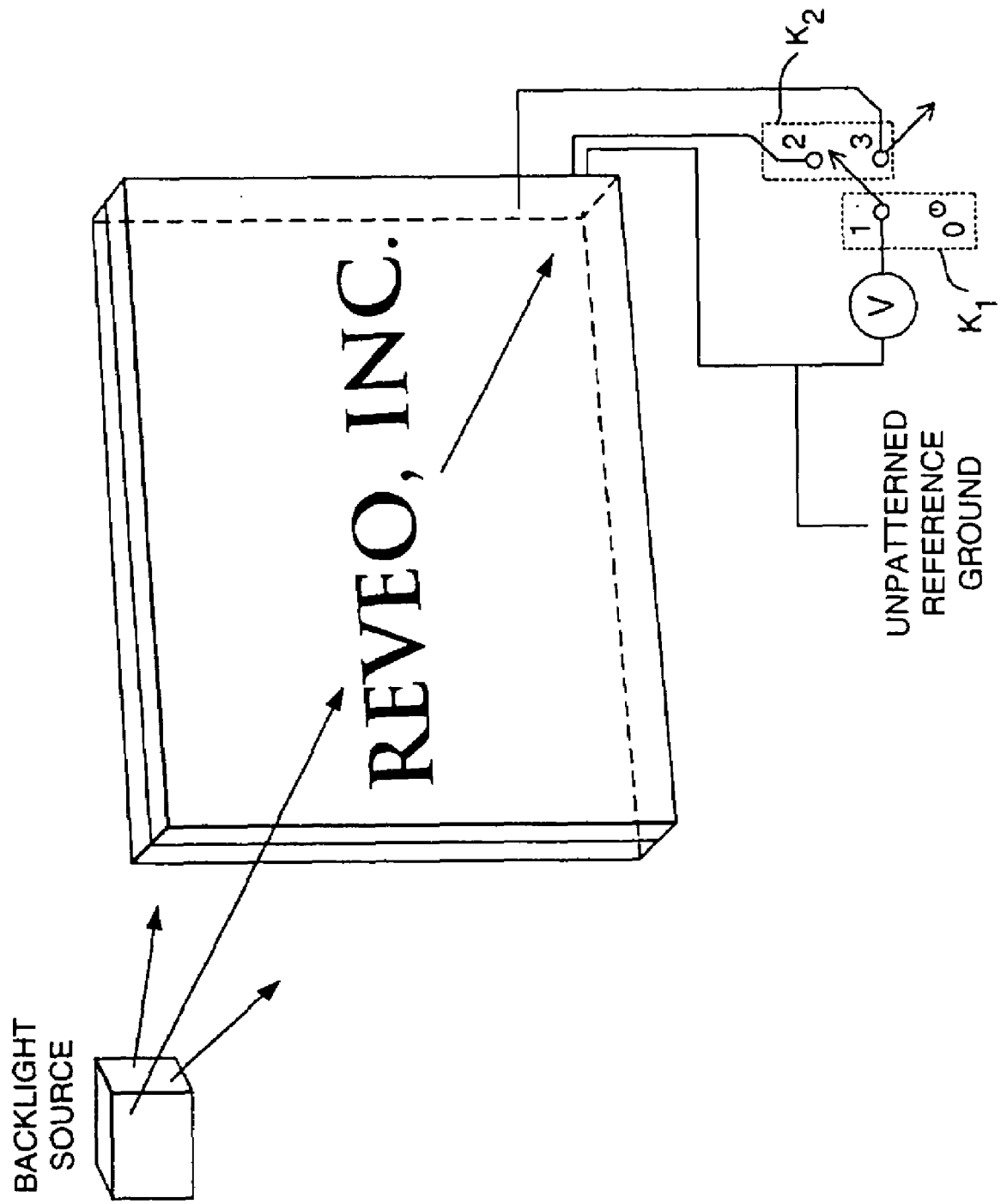
FIG. 15 is a perspective away view of an illustrative embodiment of an back-lit electro-optical PSCT-based signage system of the present invention employing a PSCT-based glazing panel having electrically-conductive layers that are geometrically patterned so as to correspond to signage work to be displayed accordance with material is contained between a pair of PET-type plastic substrate panels in accordance with the principles of the present invention.

Electrically-Switchable Back-Lit PSCT-Based Signage Panel of the Present Invention In FIG. 15, the edge-lit PSCT-based signage panel of the present invention has been modified to provide a back-lit PSCT-based signage panel having substantially similar states of operation provided by the device described in FIG. 10, with the advantage of being able to use high-intensity back-type lighting sources.

The Electrically-Switchable Edge-Lit PSCT-Based Signage Panel of the Second Illustrative Embodiment of the Present Invention In FIGS. 16 and 17, edge-lightable PSCT-based signage panel of FIG. 10 is shown integrated into a more advanced edge-lit electro-optical lighting panel having universal usage as: (1) an electrically-switchable privacy window offering greatly enhanced privacy protection; (2) an electrically-switchable lighting panel for illumination of interior or exterior environments; and (3) a signage board for use in advertising, decoration, showcases and signage in either day time or night viewing environments.

In FIG. 16, the structure of this novel PSCT-based lighting/illumination panel is schematically depicted. The operating/function table set forth in FIG. 1 describes the operations and functions of the PSCT-based lighting panel.

As illustrated in FIG. 17, this novel device has a diverse set of electrically-switchable display states for use in various applications including, for example: conventional switchable privacy glazings; advertising and/or signage boards for day-time applications; privacy glazings and darkness control applications; conventional switchable privacy glazing applications with enhanced privacy-protection; two-way surface lighting panel applications; advertising and/or signage boards for night-time applications; one-way surface light source applications; switchable mirror applications; and advertising and/or signage boards for night-time applications in a one-way lighting fashion.

As shown in FIG. 16, the electro-optical lighting device of the present invention comprises: an electrically-switchable broadband left-handed cholesteric liquid crystal (BBLH-CLC) panel; an electrically-switchable broadband right-handed cholesteric liquid crystal (BBRH CLC) panel; an electrically-switchable PSCT panel, having a geometrically patterned ITO layer, as described in FIG. 10, and being edge-lightable by a pair of pair of electrically controlled cold cathode fluorescent lamps (CCFL); and a plurality of unpatterned ITO layers, arranged so that the electrically-switchable BBLHCLC panel and BBRH CLC panel can be electrically-switched ON and OFF, as taught in Applicant prior WIPO Publication No. WO 98/38547 published on Sep. 3, 1998, and incorporated herein by reference in its entirety.

In this particular embodiment, the electrically-switchable broadband CLC panels (i.e., BBLH CLC and BBRH CLC panels) reflect the whole visible spectral light. They can be electric switched between the reflection and transparent states. When in the reflective state, the two BB CLC panels function as a reflective mirror whose reflectivity depends on the applied voltage value. The electrically-switchable PSCT panel scatters light in the visible and can be electrically switched between translucent and transparent states. As shown and described above, one of the electrically-conductive electrodes (i.e., ITO layers) in the PSCT panel is geometrically patterned. When the PSCT panel is operated in its translucent state, it scatters light.

As shown, the, light, emitting from the electrically-controlled CCFL is efficiency coupled into the wave-guiding PSCT structure. In the ideal case, when the PSCT panel is operated in the transparent state (i.e. no light scattering happens), the wave-guided light is confined inside the slab and does not leak out. However, when the PSCT panel is operated in its scattering state, the wave vectors associated with the propagating waveguided mode are disturbed and therefore changes its direction. As a result, the waveguided light is de-coupled from the wave guiding PSCT structure and the panel functions as a surface light source. The de-coupled light emits in both forward and backward directions. Assuming that the backward emitted light hits the LH CLC and RH CLC, if the two BB CLC panels are operated in their transparent states of operation, then the composite lighting panel will illuminate in both directions (from front and rear surfaces). However, if the two BBCLC panels are operated in their reflective states of operation, then the composite light panel will illuminate in only in one direction (i.e. from its front surface).

Notably, when CCFL is operated in its ON state (i.e. emitting light), the device of FIG. 16, when used as a privacy window, provides with an enhanced privacy protection. This is important particularly in night time. The is because the light emitted from the panel will diminish the shadow of an object that is projected onto the glazing by the interior light source. Such a privacy protection can be even more enhanced if the two CLC's are in the reflective state.

Additional Embodiments of the Electro-Optical Glazing Structure of the Present Invention The electro-optical glazing panels hereof described hereinabove can be combined in various ways as taught in copending U.S. application Ser. No. 09/032,302, supra, in order to provide intelligent glazing structures capable of controlling light transmission therethrough in any number of radiation bands.

The intelligent glazing structure of the present invention taught hereinabove allows a very large part of the visible spectrum to be substantially totally scattered.

Having described such alternative embodiments of the present invention, further modifications thereto readily come to mind.

For example, the electro-optical glazing structures described above can be stacked and laminated together, in virtually any number or ordering, so as form composite electro-optical glazing structures having more than two optical states (e.g. four or more). Such electro-optical glazing structures can be used to construct sophisticated window systems capable of providing complex levels of solar and/or visible radiation control.

Electrically controlled CLC-based smart windows of the present invention can be used in homes, schools, offices, factories, as well as in automobiles and airplanes to provide privacy, brightness control, and reduce thermal loading on heating and cooling systems employed therein.

The electro-optical glazings of the present invention can be used to make intelligent sunglasses and sun visors for use in a variety of applications. In such embodiments of the present invention, the electro-optical glazing of the present invention is realized in the form of a pair of lenses which are mounted within a frame supportable upon the head of its user, as in conventional eyeglasses or sun-visors. The programmed microcontroller, battery, electromagnetic detector, battery recharging circuitry and optical state switching circuitry embodied within the window frame shown in FIGS. 1A and 1B can be reduced in size and embodied within the ultra-compact sunglasses frame of this illustrative embodiment of the present invention.

The electro-optical glazings of the present invention can be used in automotive vehicles, maritime vessels, aircrafts and spacecrafts. The structures of the present invention can also be used to make spatial light intensity modulation (SLM) panels, having pixelated or unpixelated surfaces.

The transmission and scattering characteristics of the electro-optical panels of the present invention are bi-directional in nature, and do not depend on the polarization state of the wavelengths of incident light. Thus regardless of the polarization state of incident light, when the electro-optical glazing panel is operated in its transmission mode, incident light is transmitted in either direction with minimal scattering; whereas, when the electro-optical glazing panel is operated in its scattering mode, incident light is scattered in either direction, wherein the ratio of forward-scatter-to-backward-scatter being at least 3/1 (e.g. 75%/25%). It is understood, however, that this ratio can be modified from embodiment to embodiment of the present invention as the application at hand requires.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying claims to Invention.

What is claimed is:

1. An electro-optical glazing structure comprising:
    an electro-optical glazing panel including polymer stabilized cholesteric texture liquid crystal material between electrically conductive electrodes having a first state of operation and a second state of operation,
        said polymer stabilized cholesteric texture liquid crystal material includes a polymer network formed from a polymerization product of a non-reactive chiral liquid crystal material, a monomer, and a photo-initiator, wherein a polymer network is free of a mesogenic groups,
    a radiation sensor coupled to said glazing panel for sensing electromagnetic radiation incident on said glazing panel; and
    a microcontroller coupled to said sensor and said microcontroller for switching said glazing panel from said first state of operation to said second state of operation, wherein said switching from said first state of operation to said second state of operation is responsive to said electromagnetic radiation.

2. The electro-optical glazing structure of claim 1, wherein said first state of operation is totally-scattering mode of operation.

3. The electro-optical glazing structure of claim 1, wherein said second state of operation is transmission mode of operation.

4. An electro-optical glazing structure comprising:
    an electro-optical glazing panel including polymer stabilized cholesteric texture liquid crystal material between electrically conductive electrodes having a first state of operation and a second state of operation,
        wherein said polymer stabilized cholesteric texture liquid crystal material includes dichroic dyes;

a radiation sensor coupled to said glazing panel for sensing electromagnetic radiation incident on said glazing panel; and a microcontroller coupled to said sensor and said microcontroller for switching said glazing panel from said first state of operation to said second state of operation, wherein said switching from said first state of operation to said second state of operation is responsive to said electromagnetic radiation.

5. The electro-optical glazing structure of claim 4, wherein said first state of operation is totally-scattering mode of operation.

6. The electro-optical glazing structure of claim 4, wherein said second state of operation is transmission mode of operation.

* * * * *